(12) United States Patent  
Betz

(10) Patent No.: US 7,770,344 B2
(45) Date of Patent: Aug. 10, 2010

(54) UNDER-FLOOR CABLE SUPPORT SYSTEM

(75) Inventor: Jason F. Betz, Maryville, IL (US)

(73) Assignee: Cooper Technologies Company, Houston, TX (US)

( * ) Notice: Subject to any disclaimer, the term of this patent is extended or adjusted under 35 U.S.C. 154(b) by 226 days.

(21) Appl. No.: 11/866,647

(22) Filed: Oct. 3, 2007

(65) Prior Publication Data

US 2009/0090549 A1   Apr. 9, 2009

(51) Int. Cl.
*E04B 5/48* (2006.01)
(52) U.S. Cl. .......................... 52/263; 52/220.1; 52/126.6
(58) Field of Classification Search .............. 52/220.1, 52/220.2, 220.3, 263, 126.6, 262, 126.1, 52/126.5; 108/152.1, 155, 156, 147.21; 174/72 A, 174/68.1, 99 R, 100, 101; 211/126.9, 126.11, 211/133.1, 162, 208, 175, 189; 248/49
See application file for complete search history.

(56) References Cited

U.S. PATENT DOCUMENTS

| | | | | |
|---|---|---|---|---|
| 1,298,359 A | * | 3/1919 | Lane | ............................ 211/162 |
| 1,846,144 A | | 2/1932 | Risbridger | |
| 2,692,176 A | * | 10/1954 | Miller | .......................... 108/155 |
| 2,912,197 A | | 11/1959 | Hudson | |
| 2,956,763 A | | 10/1960 | D'Arca | |
| 3,261,309 A | * | 7/1966 | Kinnear | ........................ 108/156 |
| 3,389,882 A | | 6/1968 | Schlosser | |
| 3,665,869 A | | 5/1972 | Howe | |
| 3,787,016 A | | 1/1974 | Laval, Jr. | |
| 3,923,277 A | | 12/1975 | Perrault | |
| 4,098,409 A | | 7/1978 | Massey | |
| 4,539,457 A | | 9/1985 | Pinger | |
| 4,559,749 A | | 12/1985 | Nusbaum | |
| 4,596,095 A | | 6/1986 | Chalfant | |
| 4,630,417 A | | 12/1986 | Collier | |

(Continued)

FOREIGN PATENT DOCUMENTS

DE    3736408 A1    7/1988

(Continued)

OTHER PUBLICATIONS

Cablofil, Under Floor reference sheets, 2005, 20 pgs, Cablofil.

(Continued)

*Primary Examiner*—Brian E Glessner
*Assistant Examiner*—Patrick Maestri
(74) *Attorney, Agent, or Firm*—Senniger Powers LLP

(57) ABSTRACT

An under-floor cable support system comprising a first plurality of free-standing cable stands positioned on a sub-floor and movable independent of the floor-supporting pedestals. Each cable stand comprises a cross bar on a pair of spaced apart legs for supporting a cable tray at an elevation above the sub-floor and below the floor. Holding mechanisms are provided on the cable stands for holding a second plurality of cable stands stacked on top of the first plurality of cable stands. The second plurality of cable stands may be stands with two legs or cantilever cable stands with one leg. In other aspects, the legs of the cable stands are movable to adjust the spacing between the legs and to collapse the legs for compactness.

36 Claims, 23 Drawing Sheets

U.S. PATENT DOCUMENTS

| | | | | |
|---|---|---|---|---|
| 4,676,036 | A | 6/1987 | Bessert | |
| 4,765,576 | A | 8/1988 | Peled | |
| 4,876,834 | A | 10/1989 | Domigan | |
| RE33,220 | E | 5/1990 | Collier | |
| 4,949,924 | A | 8/1990 | Carmody | |
| 4,960,253 | A | 10/1990 | Perrault | |
| 5,049,700 | A | 9/1991 | Kobayashi | |
| 5,100,086 | A | 3/1992 | Rinderer | |
| 5,169,011 | A | 12/1992 | Ebeling | |
| 5,316,244 | A | 5/1994 | Zetena, Jr. | |
| 5,389,737 | A | 2/1995 | Kobayashi | |
| 5,477,649 | A | 12/1995 | Bessert | |
| 5,546,717 | A | 8/1996 | Penczak | |
| 5,547,307 | A | 8/1996 | Decore | |
| 5,548,932 | A * | 8/1996 | Mead | 52/126.6 |
| 5,560,449 | A * | 10/1996 | Smith | 182/153 |
| 5,660,637 | A | 8/1997 | Dodge | |
| 5,711,504 | A | 1/1998 | Cusimano | |
| 5,752,679 | A | 5/1998 | Thomason | |
| 5,839,702 | A | 11/1998 | Jette | |
| 5,901,515 | A | 5/1999 | Chen | |
| 5,953,870 | A | 9/1999 | Jette | |
| 6,019,323 | A | 2/2000 | Jette | |
| 6,061,884 | A | 5/2000 | Ohms | |
| 6,061,984 | A | 5/2000 | Rose | |
| 6,135,299 | A | 10/2000 | Burgess | |
| 6,206,613 | B1 | 3/2001 | Elkins | |
| 6,347,493 | B1 | 2/2002 | Jette | |
| 6,354,542 | B1 | 3/2002 | Meyer | |
| 6,361,000 | B1 | 3/2002 | Jette | |
| 6,427,400 | B1 | 8/2002 | Greenblatt | |
| 6,446,914 | B1 | 9/2002 | Laberis | |
| 6,449,912 | B2 | 9/2002 | Jette | |
| 6,460,812 | B1 | 10/2002 | Jette | |
| 6,463,704 | B1 | 10/2002 | Jette | |
| 6,547,192 | B2 | 4/2003 | Rinderer | |
| 6,592,093 | B2 | 7/2003 | Valentz | |
| 6,637,165 | B2 | 10/2003 | Jette | |
| 6,637,704 | B2 | 10/2003 | Jette | |
| 6,644,601 | B2 | 11/2003 | Aussiker | |
| 6,672,022 | B2 | 1/2004 | Simmons | |
| 6,681,895 | B2 * | 1/2004 | Virtue | 182/186.3 |
| 6,855,884 | B2 | 2/2005 | Spagnoli | |
| 6,918,217 | B2 | 7/2005 | Jakob-Bamberg | |
| 6,926,236 | B2 | 8/2005 | Jette | |
| 7,055,786 | B2 | 6/2006 | Garassino | |
| 7,096,520 | B2 | 8/2006 | Nicolia | |
| 7,130,521 | B2 | 10/2006 | McCrary | |
| 7,168,212 | B2 | 1/2007 | Jette | |
| 7,373,759 | B1 * | 5/2008 | Simmons | 52/220.5 |
| 2002/0030143 | A1 | 3/2002 | Jette | |
| 2004/0031886 | A1 | 2/2004 | Jette | |
| 2004/0049998 | A1 | 3/2004 | Jette | |
| 2004/0055232 | A1 | 3/2004 | Jette | |
| 2004/0104322 | A1 | 6/2004 | Hennequin | |
| 2004/0113025 | A1 | 6/2004 | Sargent | |
| 2004/0144898 | A1 * | 7/2004 | Spagnoli | 248/68.1 |
| 2004/0222179 | A1 * | 11/2004 | Garcia | 211/206 |
| 2006/0038091 | A1 | 2/2006 | Winn | |
| 2006/0130715 | A1 | 6/2006 | Yoo | |
| 2006/0138067 | A1 | 6/2006 | Tourlamain | |

FOREIGN PATENT DOCUMENTS

JP         2002061276         2/2002

OTHER PUBLICATIONS

Flextray, "Today's time and money saving alternative to traditional cable tray systems" brochure, Jan. 1997, 8 pgs.

International Search Report regarding PCT/US08/71333 dated Oct. 1, 2008, 3 pages.

* cited by examiner

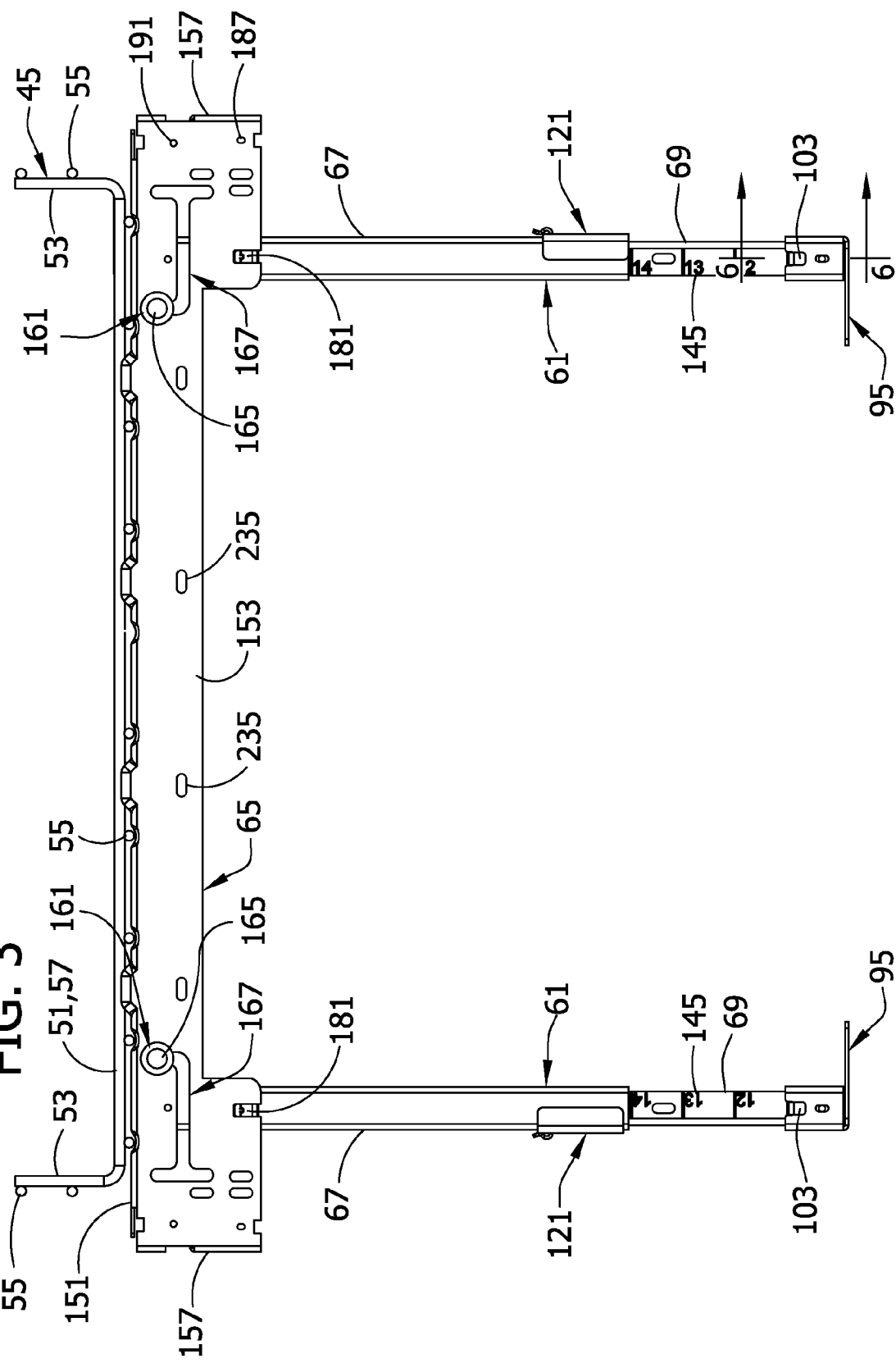

UNDER-FLOOR CABLE SUPPORT SYSTEM

BACKGROUND OF THE INVENTION

This invention relates generally to systems for supporting cable (e.g., wiring or other conductors of electrical or optical signals or electric power) and, more particularly, to systems for supporting such cable under a floor.

In conventional raised floor systems, floor panels are supported by a series of pedestals or columns secured to an under-floor. The floor panels are usually square, and the supporting pedestals are typically arranged in a grid formation (e.g., a 2'×2' formation). Cable routed through the under-floor space is supported in various ways, typically by placing the cable in trays (e.g., basket cable trays) supported by brackets, racks, cable trays or other structures attached to the floor pedestals. Such systems are shown, for example, in U.S. Pat. Nos. Re. 33,220, 4,676,036, 6,427,400, 6,672,022, 6,918,217, 5,953,870, 4,596,095, 5,477,649, 6,347,493, 6,637,165 and 7,168,212. However, in these systems, the floor pedestals must be in place before the cable supporting structure can be installed. In other systems, cable trays are supported by stands independent of the floor pedestals, but the stands have various drawbacks and do not provide needed flexibility in routing the cable. Accordingly, there is a need for an improved system for supporting and routing cable in a raised floor environment.

SUMMARY OF THE INVENTION

In one aspect, this invention is directed to an under-floor support system. The system comprises a plurality of floor pedestals positioned on a sub-floor for supporting a floor above the sub-floor, and a first plurality of free-standing cable stands positioned on the sub-floor. The cable stands are movable independent of the floor pedestals. Each cable stand of the first plurality of cable stands comprising a pair of spaced apart legs having upper and lower ends, and a cross bar supported by the legs adjacent the upper ends of the legs. The system also includes a first set of one or more cable trays supported in a generally horizontal position by at least two cable stands of the first plurality of cable stands. The first set of one or more cable trays rests on the cross bars of the at least two cable stands at an elevation above the sub-floor and below the floor. Holding mechanisms are provided on the cable stands of the first plurality of cable stands for holding a second plurality of cable stands stacked on top of the first plurality of cable stands.

In a second aspect, this invention is directed to an under-floor cable support system for supporting cable above a sub-floor and below a floor supported by floor pedestals on the sub-floor. The system comprises a first plurality of free-standing cable stands adapted to be positioned on the sub-floor. The cable stands are adapted for movement independent of the floor pedestals. Each cable stand of the first plurality of cable stands comprises a pair of spaced apart legs having upper and lower ends, and a cross bar supported by the legs adjacent the upper ends of the legs. The cross bar of each cable stand of the first plurality of cable stands has a length which is fixed and non-adjustable. Sliding connections are provided between the legs and cross bar of each cable stand of the first plurality of cable stands for permitting movement of both legs along the cross bar toward and away from one another to adjust the spacing between the legs of each cable stand. The legs are movable between a first position in which the legs are spaced relatively close together to avoid interference with said floor pedestals and a second position in which the legs are spaced farther apart to allow stacking of one cable stand on top of another. The first plurality of cable stands is adapted to support a set of one or more cable trays or cables in a generally horizontal position with the set of one or more cable trays or cables resting on the cross bars of the cable stands at an elevation above the sub-floor and below the floor.

Another aspect of this invention is directed to an under-floor cable support system for supporting cable above a sub-floor and below a floor supported by floor pedestals on the sub-floor. The system comprises a plurality of free-standing cable stands adapted to be positioned on the sub-floor. The cable stands are movable independent of said floor pedestals. Each cable stand of the plurality of cable stands comprising a pair of spaced apart legs having upper and lower ends, and a cross bar supported by the legs adjacent the upper ends of the legs. Pivot connections are provided between the legs and cross bar of each cable stand of the plurality of cable stands whereby the legs may be pivoted between a generally vertical position for supporting the cable stand and a collapsed generally horizontal position in which the legs overlap one another and extend along the cross bar. At least one of the pivot connections is vertically movable relative to the cross-bar whereby the legs may be positioned parallel to one another and flat against one another when they are in their collapsed position. The pivot connections are vertically offset when the legs are in said collapsed position. The plurality of cable stands is adapted to support a set of one or more cable trays or cables in a generally horizontal position with the set of one or more cable trays or cables resting on the cross bars of the cable stands at an elevation above the sub-floor and below the floor.

Another aspect of this invention is directed to an under-floor cable support system for supporting cable above a sub-floor and below a floor supported by floor pedestals on the sub-floor. The system comprises at least one first cable stand adapted to be positioned on the sub-floor. The first cable stand comprises a pair of spaced apart legs having upper and lower ends, and a cross bar supported by the legs adjacent the upper ends of the legs. The first cable stand is adapted to support a first cable tray or cable in a generally horizontal position resting on the cross bar of the first cable stand at an elevation above the sub-floor and below the floor. The system also includes at least one cantilever cable stand stackable on the first cable stand. The at least one cantilever cable stand comprises a leg and a first arm extending as a cantilever from the leg for supporting a second cable tray or cable in a generally horizontal position at an elevation above the first cable tray.

Other objects and features will be in part apparent an in part pointed out hereinafter.

BRIEF DESCRIPTION OF THE DRAWINGS

Corresponding parts are designated by corresponding reference numbers throughout the drawings.

DETAILED DESCRIPTION

Figure 1:
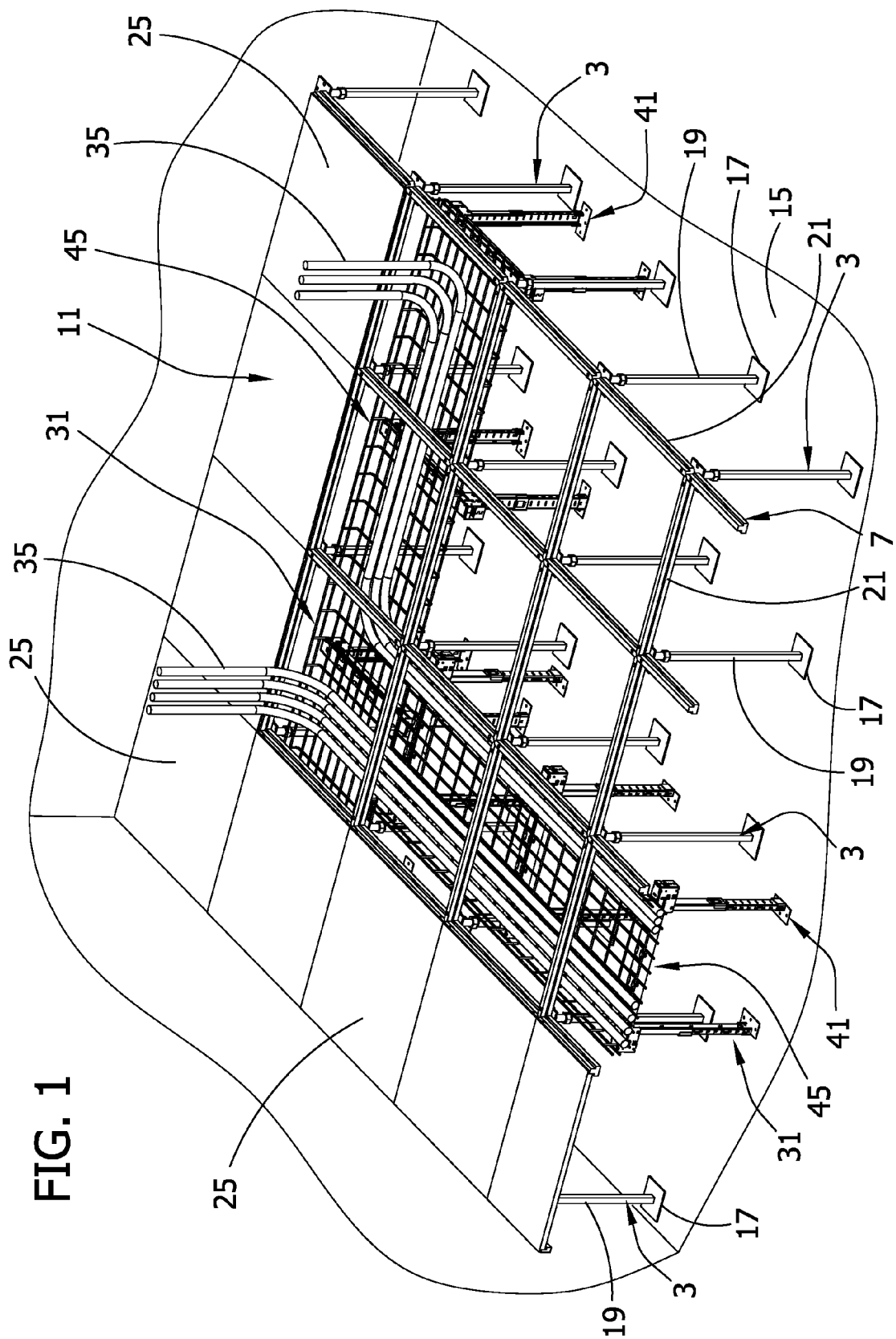
FIG. 1 is a perspective of a raised floor system incorporating one embodiment of an under-floor cable support system of this invention.

Referring now to the drawings, FIG. 1 illustrates a raised floor system 1 comprising a plurality of pedestals 3 and a floor frame 7 for supporting a raised floor 11 above a sub-floor 15. Each pedestal comprises a base 17 suitably attached to the sub-floor, and a vertical column 19 extending up from the base. The column 19 may have telescoping sections to permit adjustment of the overall height of the column to vary the spacing of the floor above the sub-floor 15. The floor frame 7 comprises a plurality of frame members 21 arranged in a grid formation connected to the upper ends of the columns 19. By way of example but not limitation, the grid formation may be a two-foot by two-foot grid. The floor 11 itself comprises a plurality of sections 25, sometimes referred to as tiles, supported by the floor frame 7. The tiles 25 are individually removable from the frame to provide access to the space below the floor.

The raised floor system 1 also includes an under-floor cable support system of the present invention, generally designated 31. This system 31 is disposed in the space between the floor 11 and the sub-floor 15 to support and route cable 35, as will be understood to those skilled in the art. In general, the system 31 comprises a first plurality of free-standing cable stands 41 positioned on the sub-floor 15 at spaced apart locations for supporting a first set of one or more cable trays 45. Typically, the under-floor cable support system 31 will include multiple cable stands 41 (e.g., ten or more) and multiple cable trays 45 but the number will vary from system to system. In any event, each cable tray 45 is supported at an elevation above the sub-floor 15 and below the raised floor 11. To facilitate access to the cable, the cable tray may be supported at an elevation immediately below the raised floor 11 (e.g., 1-2 inches below).

Figure 1A:
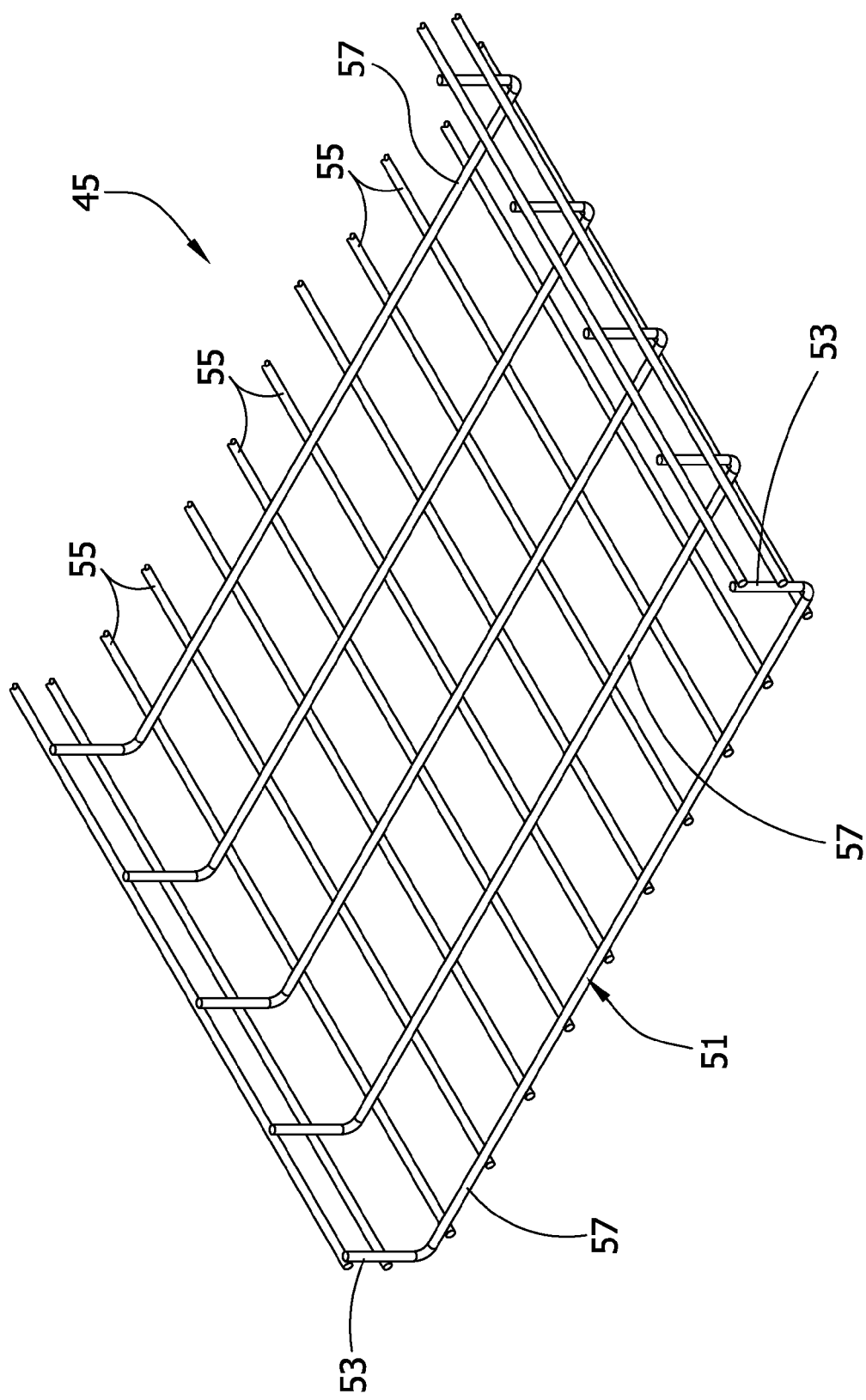

As shown in FIG. 1A, the cable trays 45 are basket wire cable trays. Each tray has a bottom 51 and opposite sides 53 extending up from the bottom, and each tray comprises longitudinal wires 55 extending longitudinally of the cable tray and transverse wires 57 extending transversely of the cable tray. Other types of cable trays (e.g., ladder cable trays or solid-bottom cable trays) may be used within the scope of this invention. Alternatively, the cable stands of this invention may be used to support conduit and other cable directly, that is, without the use of cable trays.

Figure 6:
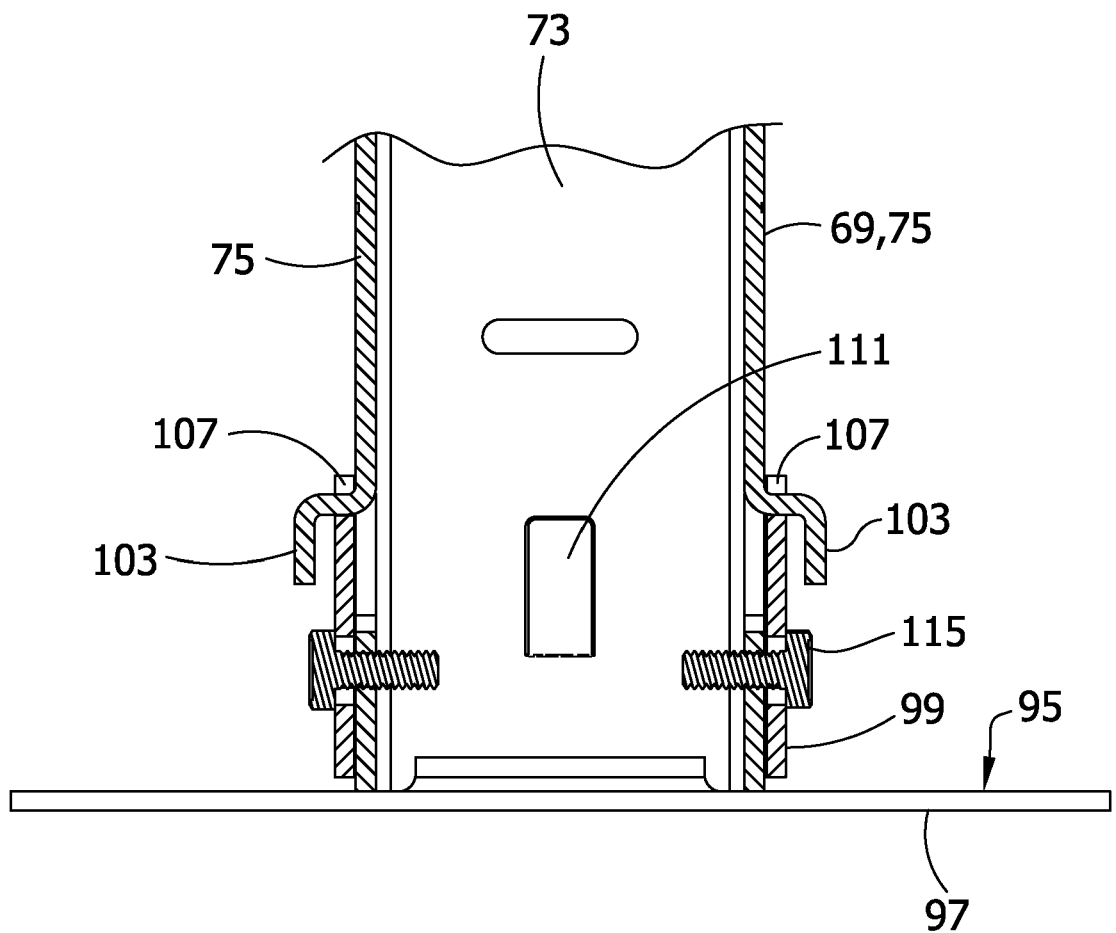
FIG. 6 is an enlarged partial section taken in the plane 6—6 of FIG. 3.
Figure 7:
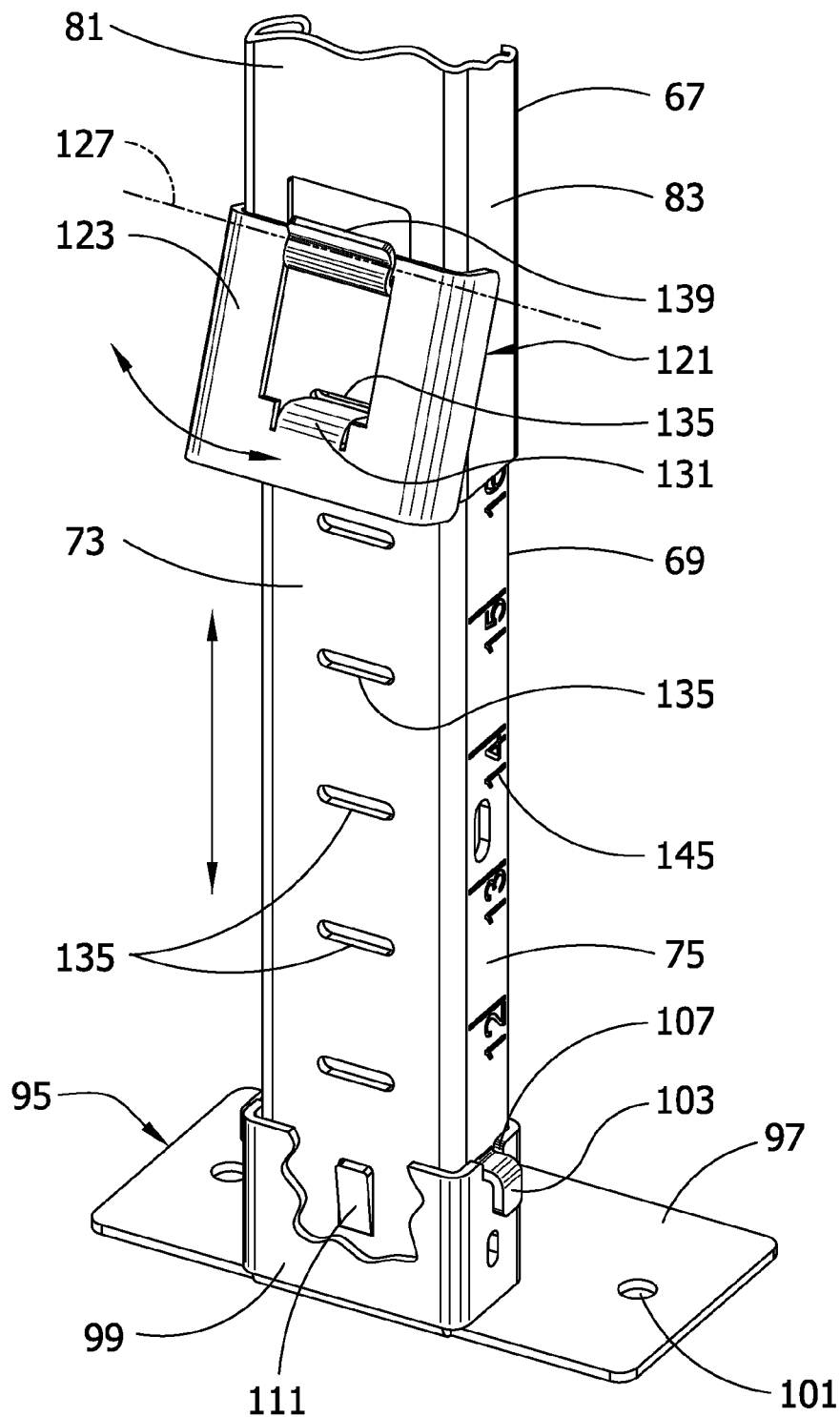
FIG. 7 is an enlarged perspective view of the lower portion of a leg of the cable stand, with a locking mechanism shown in an unlatched position.

Referring to FIGS. 2-5, each cable stand 41 comprises a pair of spaced apart legs 61 having upper and lower ends, and a cross bar 65 supported by the legs adjacent the upper ends of the legs. In this embodiment, each leg 61 is adjustable in length and comprises upper and lower sections 67, 69 having a telescoping fit. The lower section 69 is of generally channel shape with a web 73 and side flanges 75, and the upper section 67 is of generally channel shape with a web 81 and side flanges 83 having in-turned lips 85 at their outer edges defining a guide way for slidably receiving the lower section 69 of the leg. The side flanges 83 of the upper leg section 67 are enlarged toward the upper end of the leg to provide parallel ear-like extensions 91. Each leg 61 also includes a foot 95 at the lower end of the leg. The foot comprises a base plate 97 and a fitting 99 secured to the base plate defining an upward-opening socket for receiving the lower end of the lower leg section 69. The base plate 97 has openings 101 in it for receiving fasteners to secure the base plate to the sub-floor 15. To stabilize the leg 61 in the socket fitting 99, tabs 103 on the side flanges 75 of the lower leg section 69 are received in notches 107 in respective walls of the fitting 99 (see FIGS. 6 and 7). The fit of the tabs 103 in these notches 107 inhibits side sway of the leg, that is, swaying of the leg in a vertical plane containing the legs 61 and cross bar 65 of the stand. The foot 95 is held on the lower leg section 69 by a friction fit created by engagement between the socket fitting 99 and a wedge member 111 struck from the leg. Fasteners 115 (FIG. 6) may also be used secure each leg in its respective fitting.

A locking mechanism 121 is provided for locking the upper and lower leg sections 67, 69 of each leg 61 at different relative positions corresponding to the desired length of the leg. In one embodiment (FIG. 7), the mechanism 121 comprises a U-shaped latching member 123 mounted on the upper leg section 67 for pivotal movement about a generally horizontal axis 127 between latched and unlatched positions. In the latched position (FIGS. 2, 3 and 5), a protrusion (e.g., a tab 131) on the latching member 123 is received in a slot selected from a series of slots 135 spaced at intervals along the lower leg section 69 to lock the two leg sections together in adjusted position. In the unlatched position (FIG. 7), the latching member 123 is pivoted to move the protrusion 131 out of the slot 135 to permit the leg to be adjusted to a different length, after which the latching member moves to its latched position to lock the sections together. The latching member 123 is desirably biased by a spring 139 toward its latching position. It may also be biased toward its latching position only by gravity (i.e., without a spring). Other mechanisms may be used for locking the leg sections 67, 69 in different positions of adjustment. Further, the legs 61 may be constructed in other ways to permit the lengths of the legs to be adjusted and secured in adjusted position.

By way of example but not limitation, the range of vertical adjustment for the legs 61 of a cable stand 41 may be about seven inches. Further, the lengths of the leg sections 67, 69 may vary to provide a wide range of cable stand heights. For example, the lower leg sections 69 may be provided in three standard lengths to provide cable stand heights within the following three ranges: 11-18 in; 18-25 in; and 25-32 in. Other ranges are possible.

Indicia 145 are provided along the lower leg section 69 of at least one leg 61 (and preferably both legs) of the cable stand 41 to indicate various adjusted positions of the leg. In one embodiment, the indicia 145 include markings corresponding to the different elevations (e.g., in inches) at which a cable tray 45 supported by the cross bar 65 of the cable stand will be supported above the sub-floor.

Figure 2:
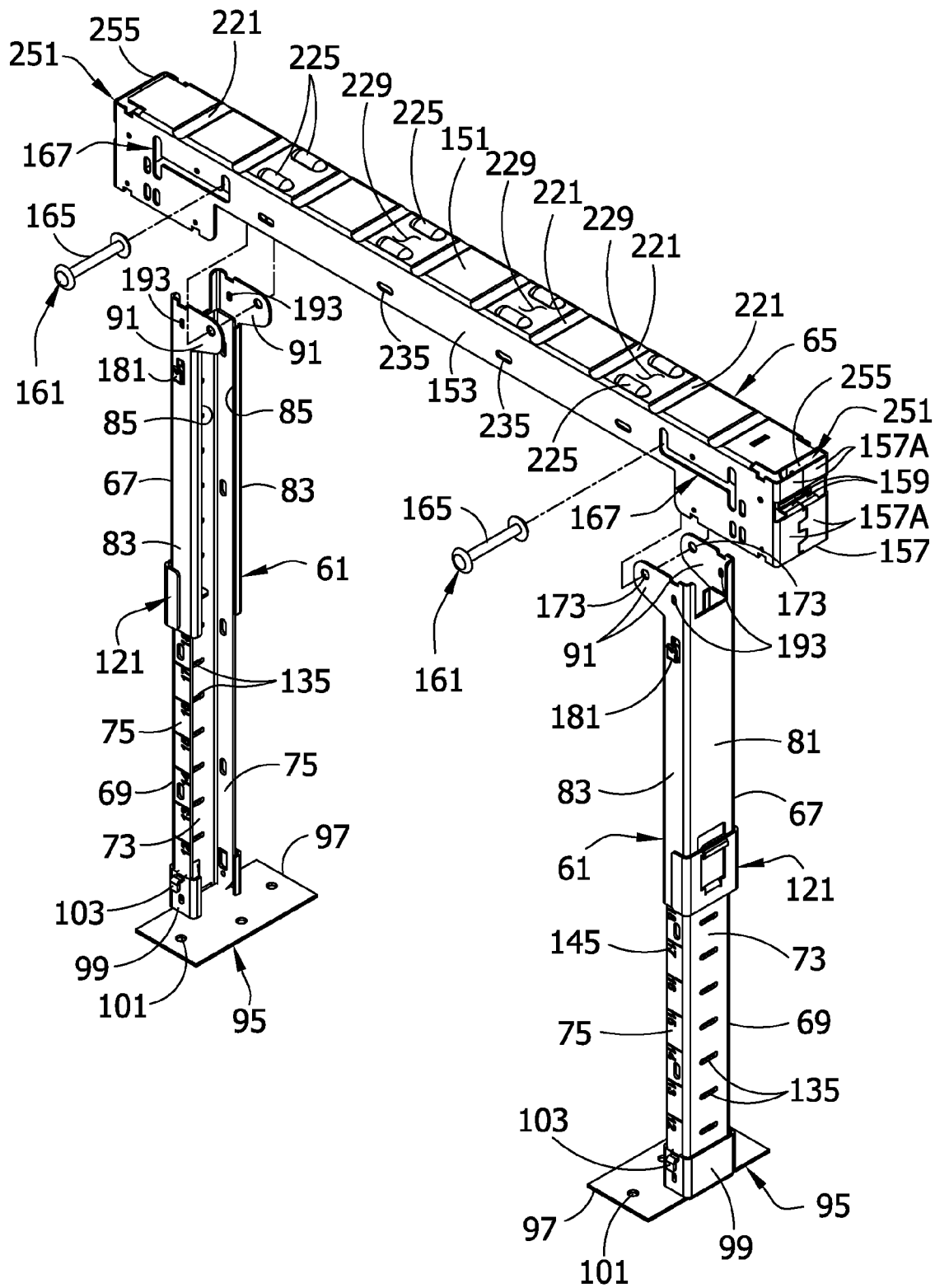
FIG. 2 is an exploded perspective of one embodiment of a cable stand of the present invention.
Figure 5:
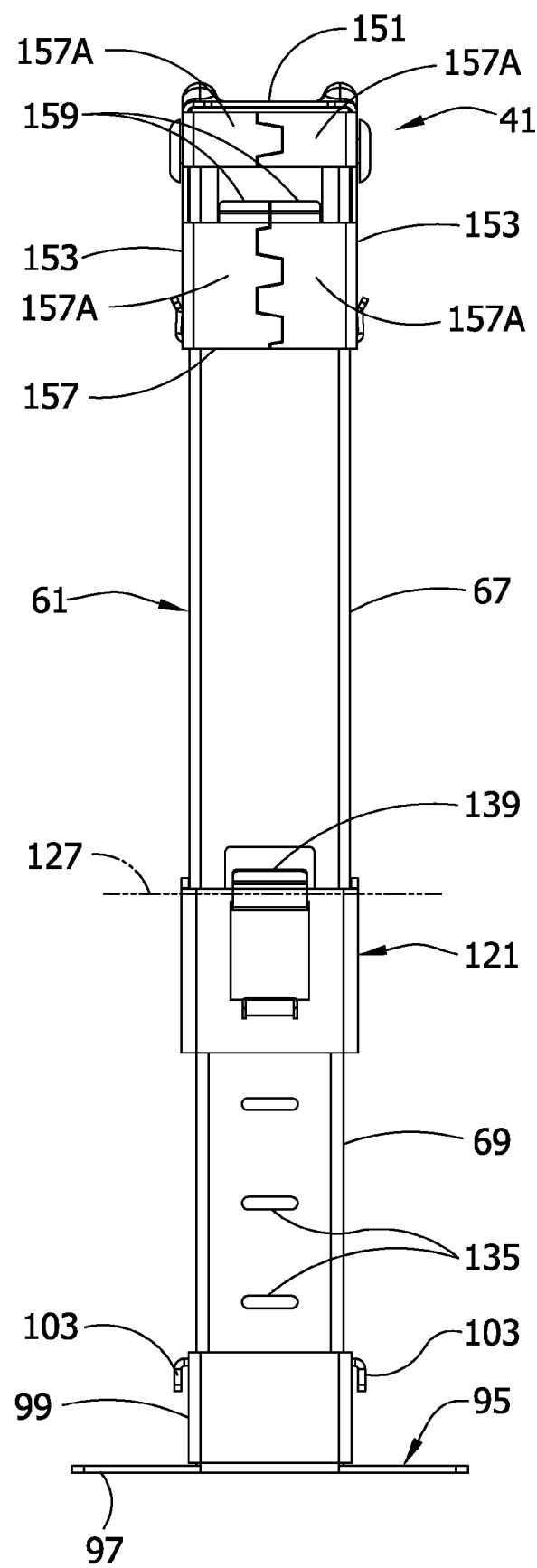
FIG. 5 is s side elevation of the cable stand.

Referring to FIG. 2, the cross bar 65 is of generally channel shape and comprises a top wall 151 and parallel side walls 153 extending down from the top wall. It may have other shapes within the scope of this invention. The ends of the cross bar 65 are closed by end walls 157 spanning the two side walls 153. In one specific embodiment, each end wall 157 is formed by upper and lower flaps 157A (FIG. 5) bent to extend generally at right angles to respective side walls 153 and having interlocking end edges. One or more cantilever supports 159 (two are shown in FIGS. 2 and 5) extend from each end wall 157 into the interior of the cross bar (i.e., into the space between the side walls of the cross bar) and have a function which will become apparent later in this description. The upper ends of the legs 61 fit up between the side walls 153 of the cross bar 65 generally adjacent opposite ends of the cross bar.

Figure 3A:
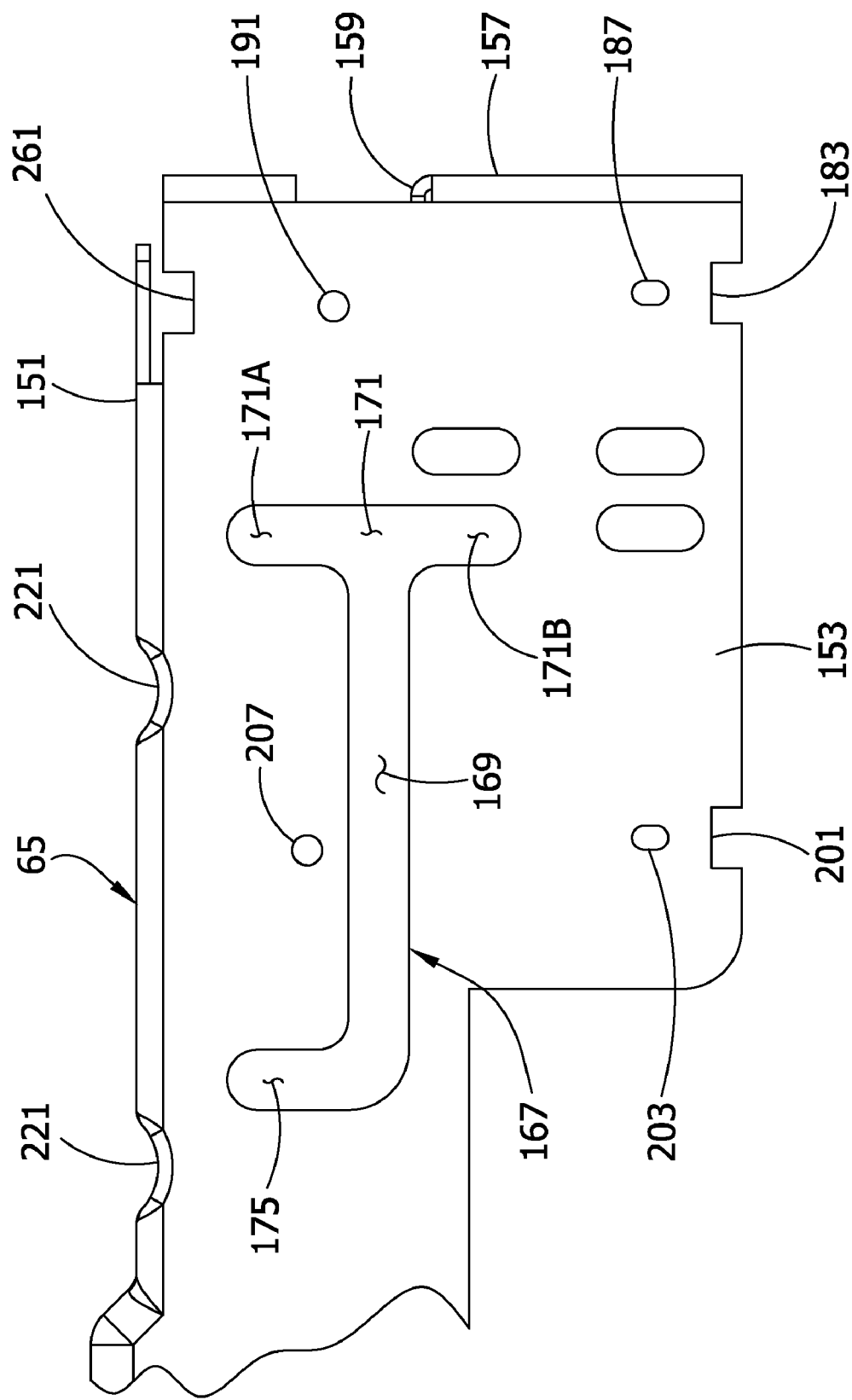
FIG. 3 is a front elevation of the cable stand of FIG. 2 showing the legs of the stand in a "narrow" position.

Referring to FIGS. 2 and 3, the legs 61 have connections with the cross bar 65, each such connection being indicated generally at 161. In this particular embodiment, these connections 161 are pivot connections, and more specifically sliding pivot connections, and even more specifically pin-and-slot connections. Each such connection 161 comprises a pivot pin 165 extending through the opposing slots 167 in the side walls 153 of the cross bar 65 and aligned holes 173 in the ear-like extensions 91 at the upper end of the leg. The aligned holes 173 in extensions 91 are clearance holes having diameters only slightly greater than the diameter of the shaft of the pin 165. Referring to FIG. 3A, each of the two opposing slots 167 of each pivot connection is configured to have a horizontal segment 169, a first vertical segment 171 at one end of the horizontal segment having an upper portion 171A extending up from the horizontal segment 169 and a lower portion 171B extending down from the horizontal segment, and a second vertical segment 175 at the opposite end of the horizontal segment extending up from the horizontal segment. By way of example but not limitation, the horizontal slot segment 169 may have a length of about 2.5 in., and the first and second vertical slot segments 171, 175 may have lengths of about 1.25 in. These dimensions may vary.

Figure 8:
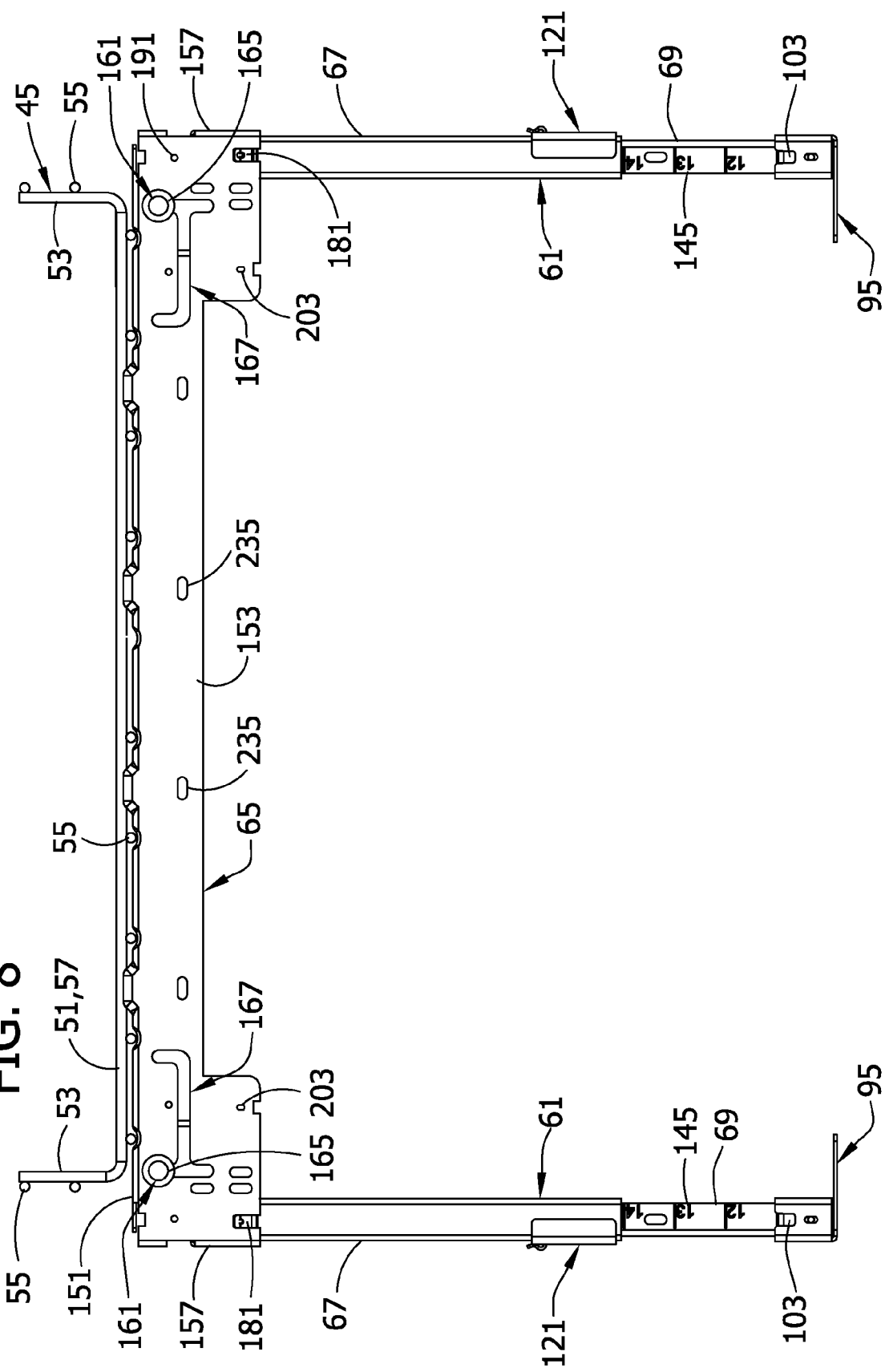
FIG. 8 is a view similar to FIG. 3 showing the legs of the cable stand in a "wide" position.

The connections 161 between the legs 61 and the cross bar 65 enable the legs to be adjusted in different ways. First, these connections allow the horizontal spacing between the legs 61 of the cable stand 41 to be adjusted by sliding the pins 165 along the horizontal segments 169 of respective slots 167 until the legs are in the desired position. The pins 165 are then moved into vertical segments (171 or 175) of respective slots to hold the legs in the selected position. In the embodiment shown in the drawings, the legs can be set in one of two positions, i.e., a first "wide" position in which they are spaced relatively far apart (FIG. 8) and a second "narrow" position in which they are spaced closer together (FIG. 3). As used herein, the terms "first position" and "second position" does not mean that the legs can be set in only two positions, but rather that the legs can be moved to at least two positions. It will be understood that the legs can be moved to additional positions without departing from the scope of this invention.

Figure 9:
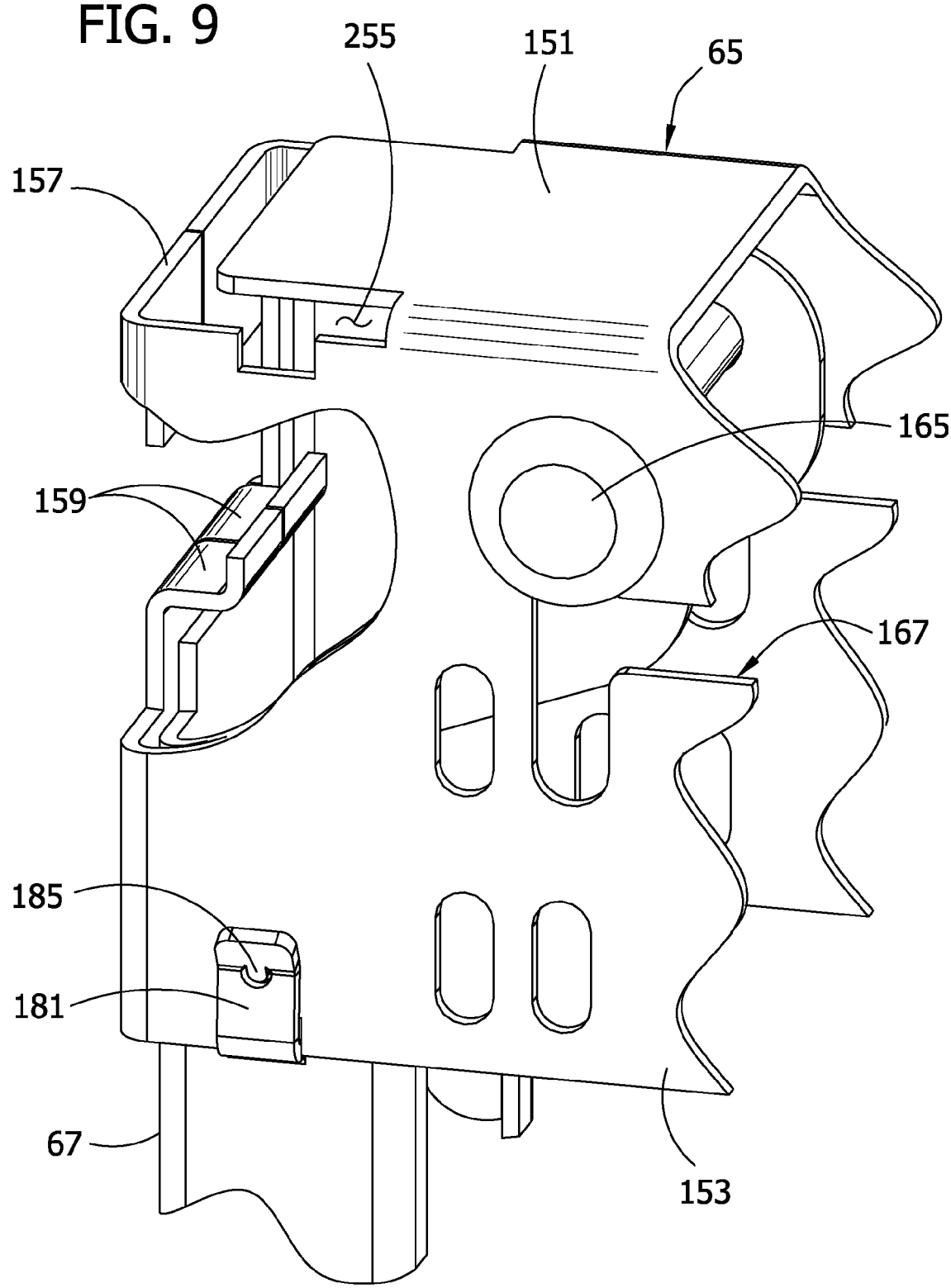
FIG. 9 is an enlarged portion of the cable stand at the juncture of one of the legs and a cross bar of the stand.

In the first or "wide" position (FIG. 8), the spacing between the legs 61 of the cable stand 41 is such that it may be stacked on top of another cable stand below it. (Two stands 41 are shown stacked in FIG. 12.) In the "wide" position, the pins 165 of the connections are moved to positions in which they are disposed relatively far apart in the first vertical segments 171 of respective slots 167. The legs are stabilized in this position by tabs 181 on the flanges 83 of each upper leg section 67 received in opposing notches 183 in the side walls of the cross bar. Each tab 181 has a protruding tongue 185 struck from the tab receivable in an opening 187 in a respective side wall 153 of the cross bar 65 to hold the leg in an upright position (see FIGS. 3A and 9). Holes 191 provided in the side walls of the cross bar align with holes 193 in the ear-like extensions 91 of the upper leg sections 67 for receiving fasteners (not shown) to lock the legs in position, if that is desired (FIGS. 2, 3 and 3A).

In the second or "narrow" position (e.g., FIG. 3), the spacing between the legs 61 is such that the feet 95 at the lower ends of the legs do not interfere with the pedestals 3 of the floor support system 7. In this position, the pins 165 of the connections 161 are moved to positions in which they are disposed relatively close together in the second vertical segments 175 of respective slots 167. The legs 61 are stabilized in this position by the tabs 181 on the flanges 83 of each upper leg section 67 received in opposing notches 201 in the side walls of the cross bar. (See FIGS. 3 and 3A; only one such tab per leg is shown in FIG. 3.) The protruding tongues 185 on the tabs 181 are receivable in respective openings 203 in the side walls 153 of the cross bar 65 to hold the leg in position. Holes 207 (FIG. 3A) in the side walls 153 of the cross bar align with holes 193 in the ear-like extensions 91 of the upper leg sections 67 for receiving fasteners (not shown) to lock the legs 61 in position, if that is desired.

The legs 61 may be adjusted toward and away from one another and held in more than two different positions by using different slot configurations. Further, mechanisms other than vertical slot segments may be used for holding the legs in their adjusted positions. Also, the legs 61 may be adjusted to an infinite number of horizontal positions along respective slots, and then locked in position by nuts or other suitable means at any selected position. It is also contemplated that the legs 61 may be connected to the cross bar 65 by using connections other than pin-and-slot connections 161. For example, one or both legs 61 may be attached to the cross bar 65 by connections such as pin-and-hole connections or bolted connections which allow the leg(s) to be removed from the cross bar and re-positioned at different horizontal locations along the cross bar to vary the spacing between the legs.

Figure 10:
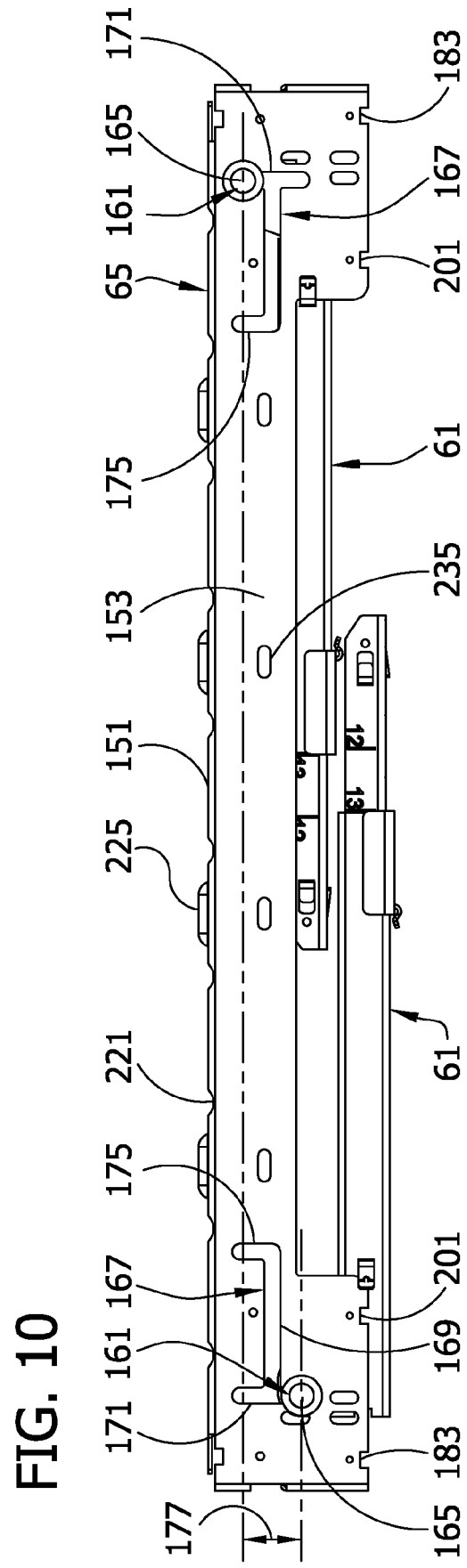
FIG. 10 is a front elevation of the cable stand showing the legs of the stand in a collapsed condition.

The connections 161 between the legs 61 and cross bar 65 also allow the legs 61 to pivot about the horizontal axes of the pins 165 between an upright, generally vertical position for supporting the cable stand 41 (FIG. 8) and a collapsed position in which the legs overlap one another and extend along the crossbar 65 (FIG. 10). Further, because the pins 165 are movable to different elevations in the vertical segments 171, 175 of respective slots 167, the legs can be collapsed to a position in which they are parallel and lie flat against one another for greater compactness. This position is illustrated best in FIG. 10 showing the pin 165 of one pivot connection 161 (the left connection) disposed in the lower portion 171B of the vertical segment 171 at the left end of the respective slot 167 and the pin 165 of the other pivot connection 161 (the right connection) disposed in the upper portion 171A of the vertical segment 171 at the right end of the respective slot. Since the two pivot pins 165 are vertically offset by a distance 177 in their respective slots 167, the legs 61 are vertically offset and able to lie flat against each other. The slots 167 are configured and positioned to accomplish this objective. (While the above description refers to each pin 165 as being disposed in a slot, it will be understood that each pin also extends through two identical and opposing slots 167 in the two side walls 153 of the cross bar.) To provide greater compactness, the feet 95 of the legs 61 are removed before the legs are folded to their collapsed condition. By way of example but not limitation, the vertical offset between the pins 165 of the two pivot connections 161 when the legs are collapsed and lie flat against one another may be about one inch.

In other embodiments, the legs 61 may be connected to the cross bar 65 for pivotal movement by vertically movable connections other than pin-and-slot connections 161. For example, one or both legs 61 may be attached to the cross bar 65 by vertically movable connections such as pin-and-hole connections or bolted connections which allow the leg(s) to be removed from the cross bar and re-positioned at a different vertical location on the cross bar to provide the vertical offset 177 which allows the legs to lie flat against one another when they are collapsed.

Figure 4:
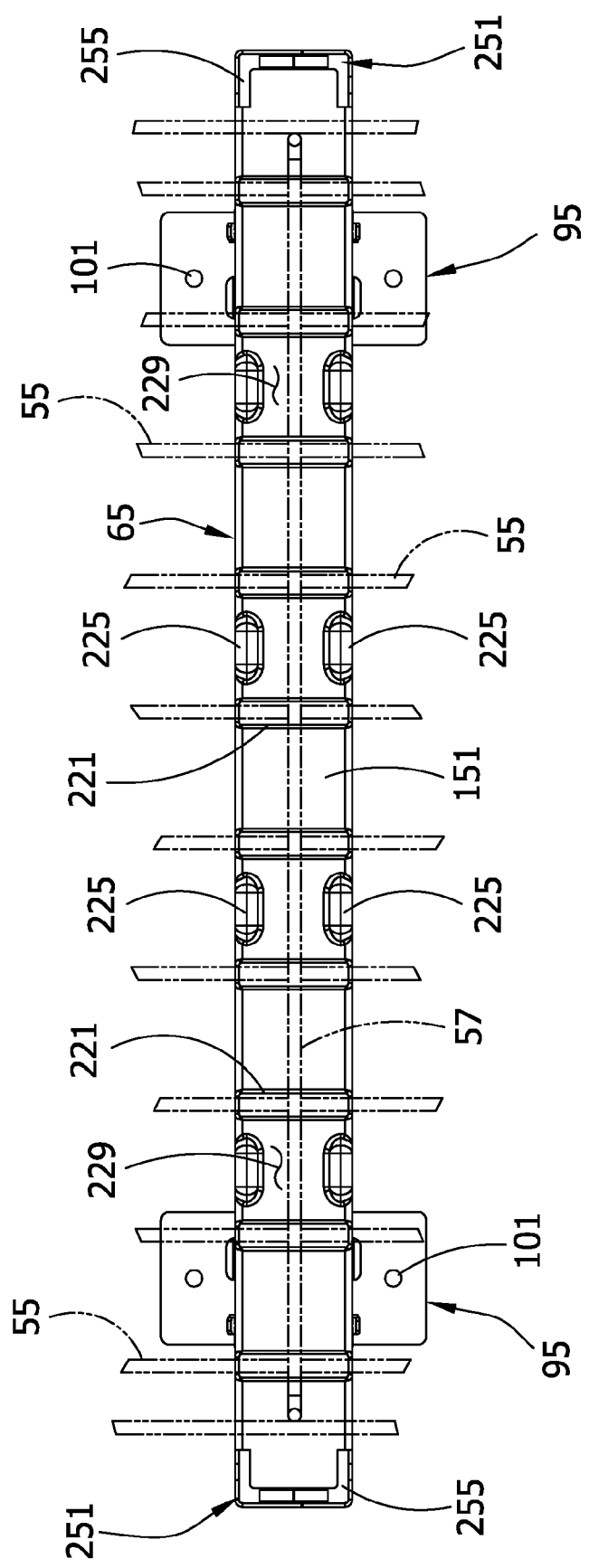
FIG. 4 is a top view of the cable stand, portions of a basket wire cable tray being shown in phantom.

The top wall 151 of the cross bar 65 has formations configured for holding basket wire cable tray 45 in position. As shown in FIGS. 2 and 4, for example, these formations include a series of parallel recesses (e.g., grooves 221) in the upper face of the top wall 151 for receiving the longitudinal wires 55 of the cable tray, and opposing bosses 225 projecting up from the top wall. The bosses 225 define a recess 229 between the bosses for receiving one or more transverse wires 57 of a basket cable tray. Slots 235 are provided at intervals along the side walls for use in securing the cable tray to the cable stand by cable ties, clips or other fastening devices.

The legs 61 and cross bar 65 are desirably fabricated as metal parts, e.g., stamped metal parts. However, it will be understood that they be made from materials other than metal.

Figure 11:
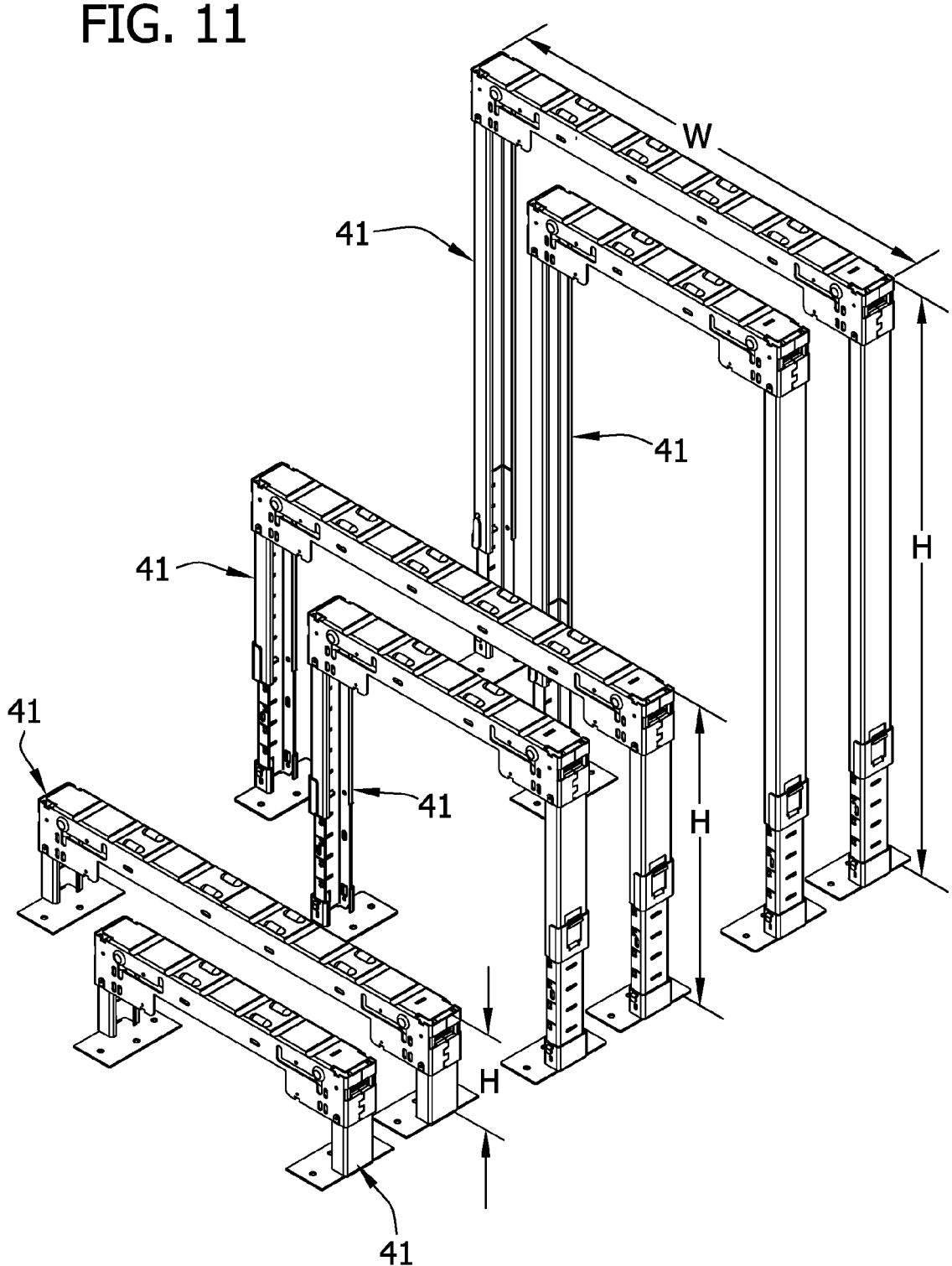
FIG. 11 is a view showing exemplary cable stands having different configurations.

The overall width of each cable stand 41 can vary, depending on the dimensions of the raised floor system 1, the size of the cable tray 45, etc. In general, the width of the cable stand 41, which corresponds to the length of the cross bar 65, is somewhat greater than the width of the cable tray it is supporting. Further, the lengths of the legs 61 of each cable stand can vary as needed, according to the height of the raised floor 11 above the sub-floor 15. In situations where the legs 61 must be short, they may have a fixed (non-adjustable) length. Several exemplary cable stands having different overall widths W, different heights H and different leg configurations are shown in FIG. 11; other widths, heights and leg configurations are possible. Similarly, the overall widths of the cable trays supported by the cable stands may vary. By way of example, a system of the present invention may use cable stands 41 and cable tray 45 having the following dimensions and configurations:

Exemplary widths of cable stands—22 in. and 14 in;

Exemplary widths of cable trays—20 in., 12 in. and 6 in; and

Exemplary heights of cable stands (range of adjustment)—11 to 18 in.; 18 to 25 in; and 25 to 32 in.

Other dimensions are within the scope of this invention.

Figure 12:
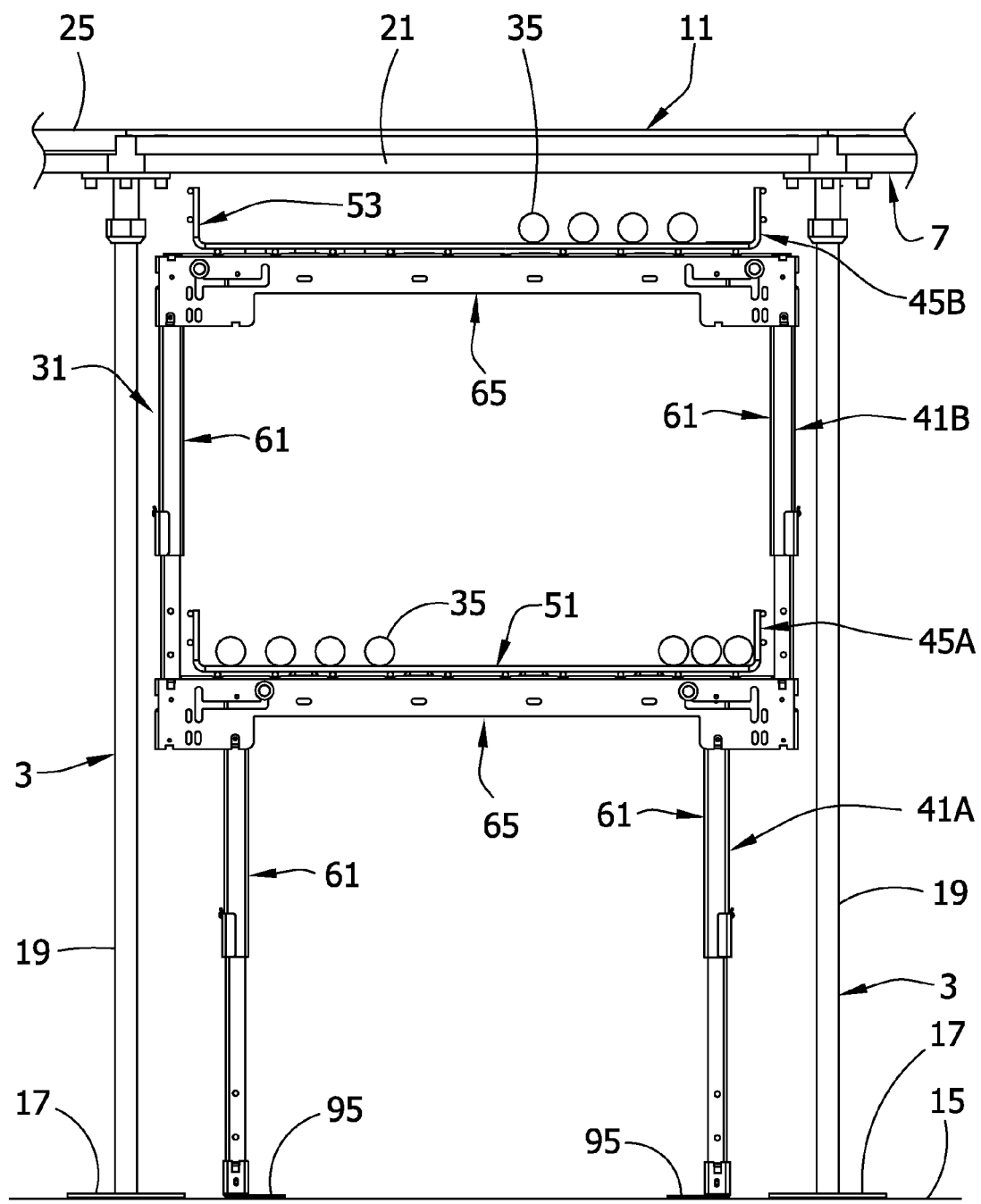
FIG. 12 is a front elevation showing one embodiment of an upper cable stand stacked on a lower cable stand for supporting cable trays at different elevations.
Figure 13:
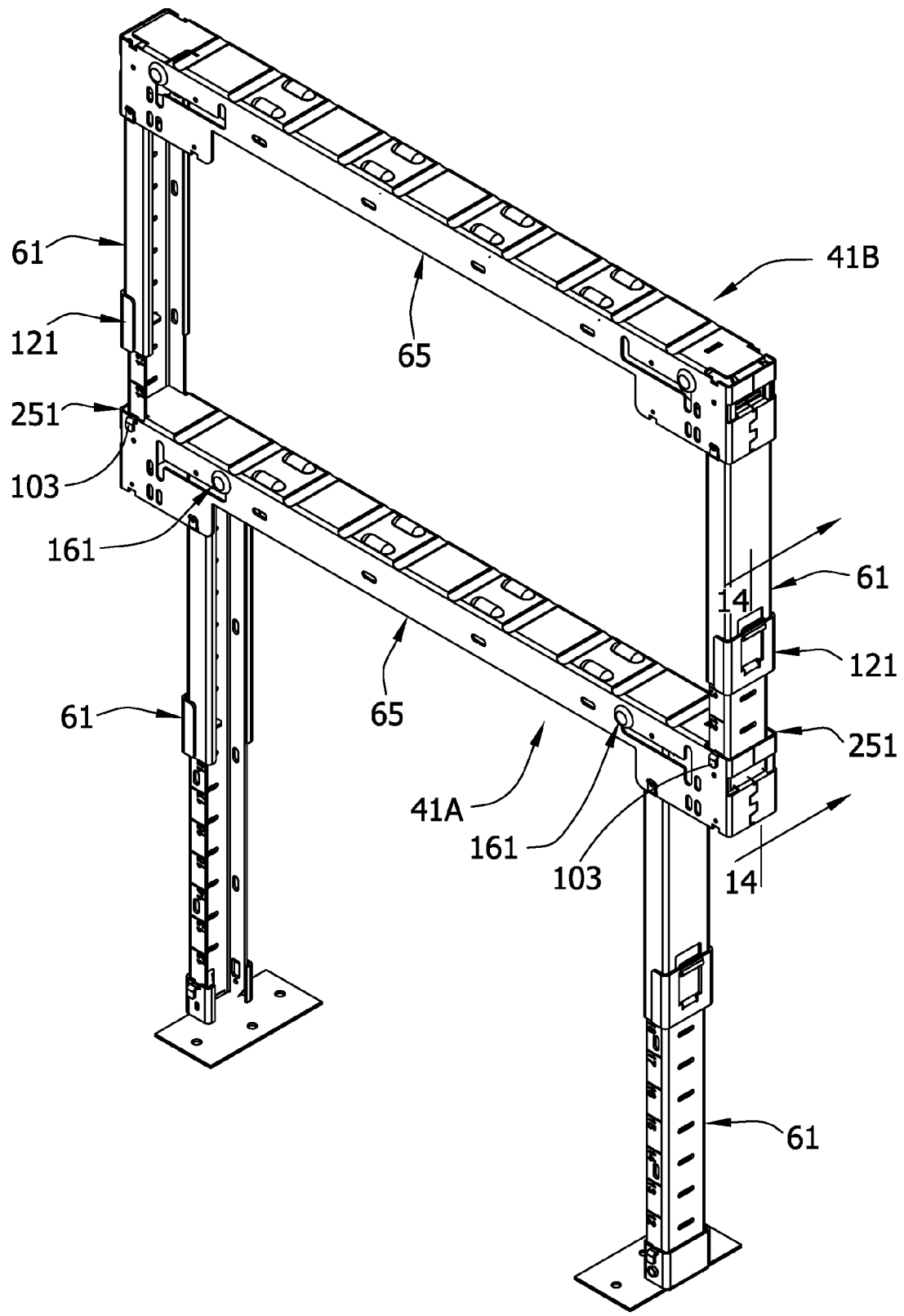
FIG. 13 is a perspective view of stacked cable stands.
Figure 14:
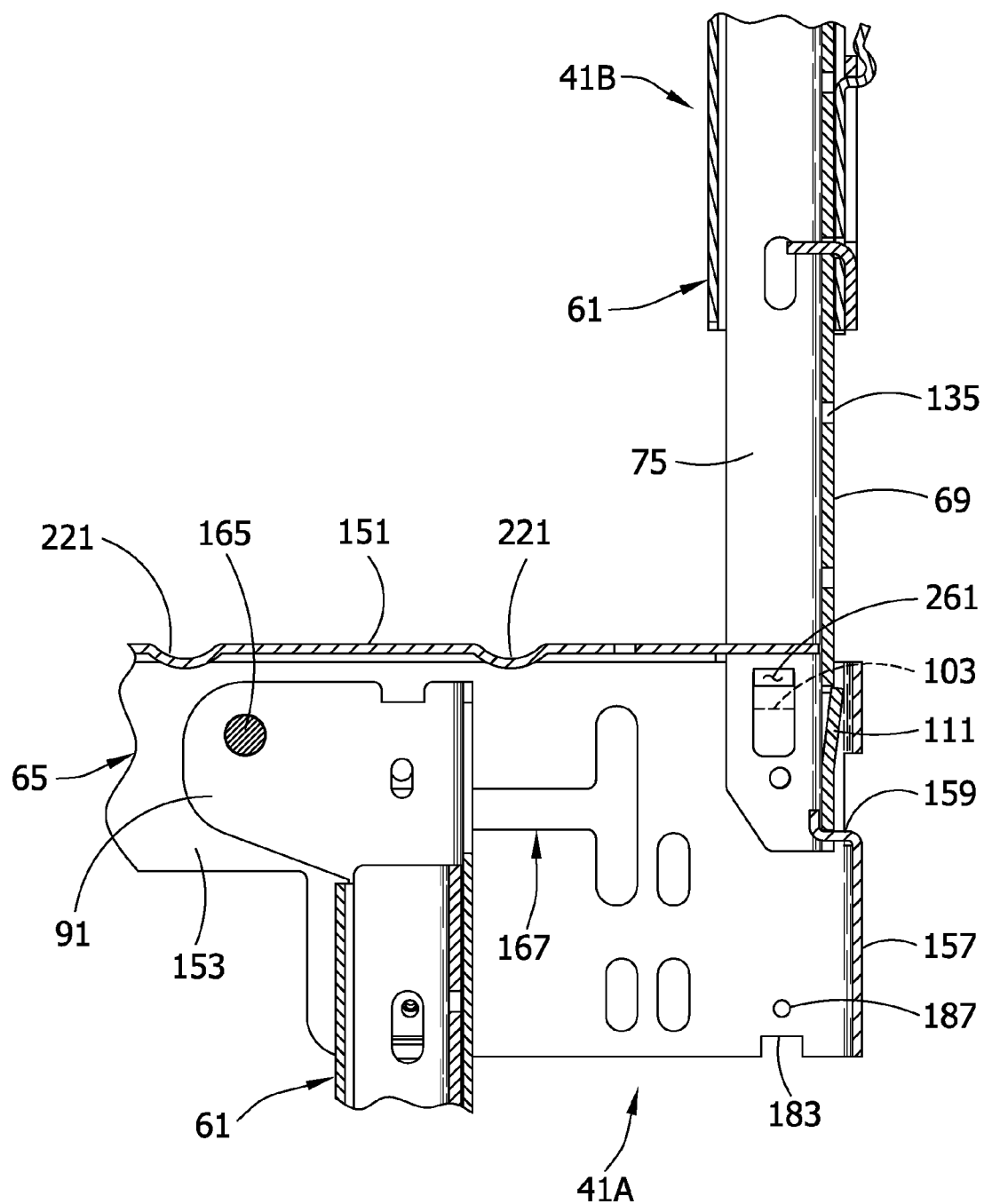
FIG. 14 is an enlarged partial section taken in the plane 14—14 of FIG. 13.
Figure 15:
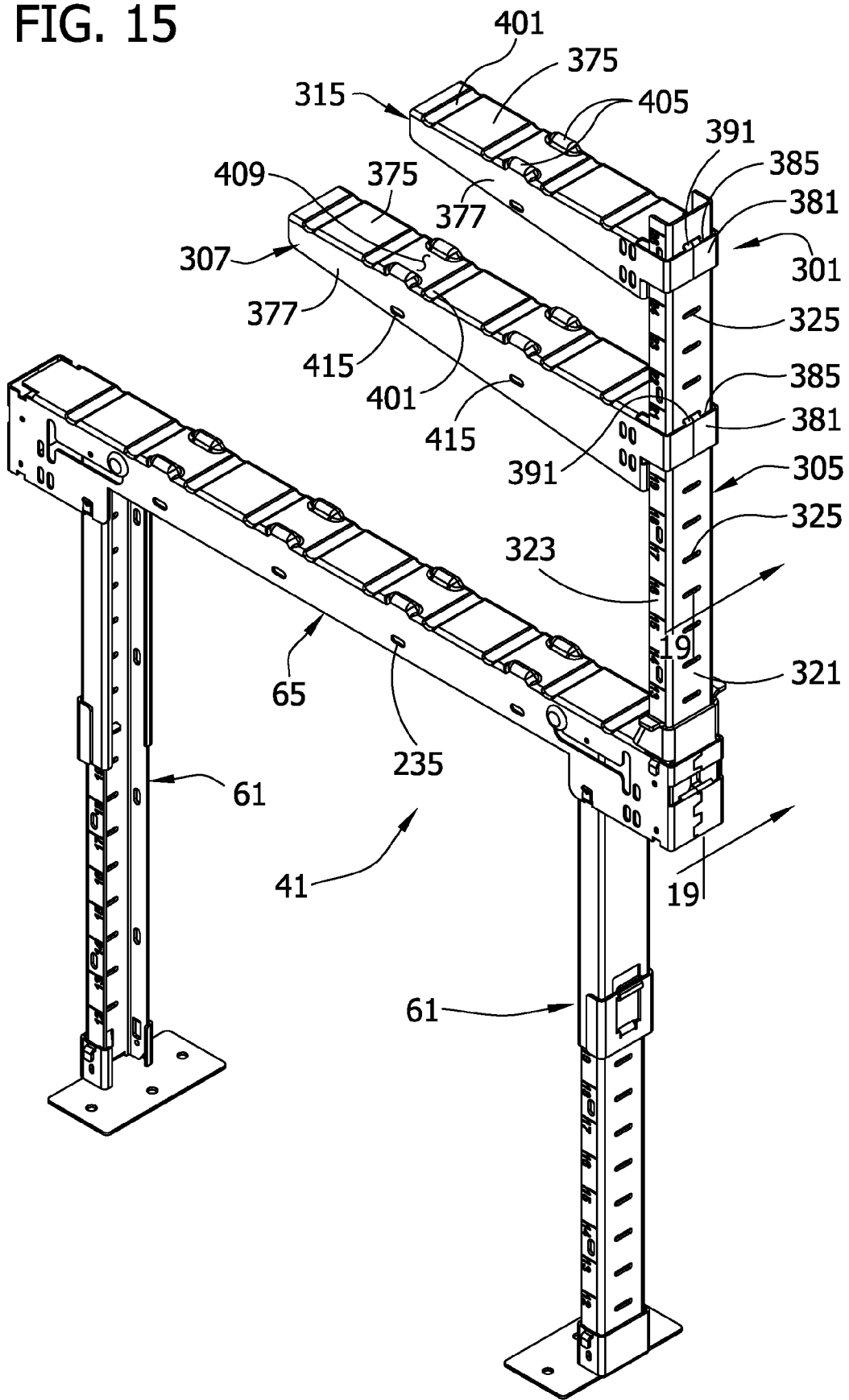
FIG. 15 is a perspective view of one embodiment of a cantilever upper cable stand stacked on a lower cable stand.
Figure 16:
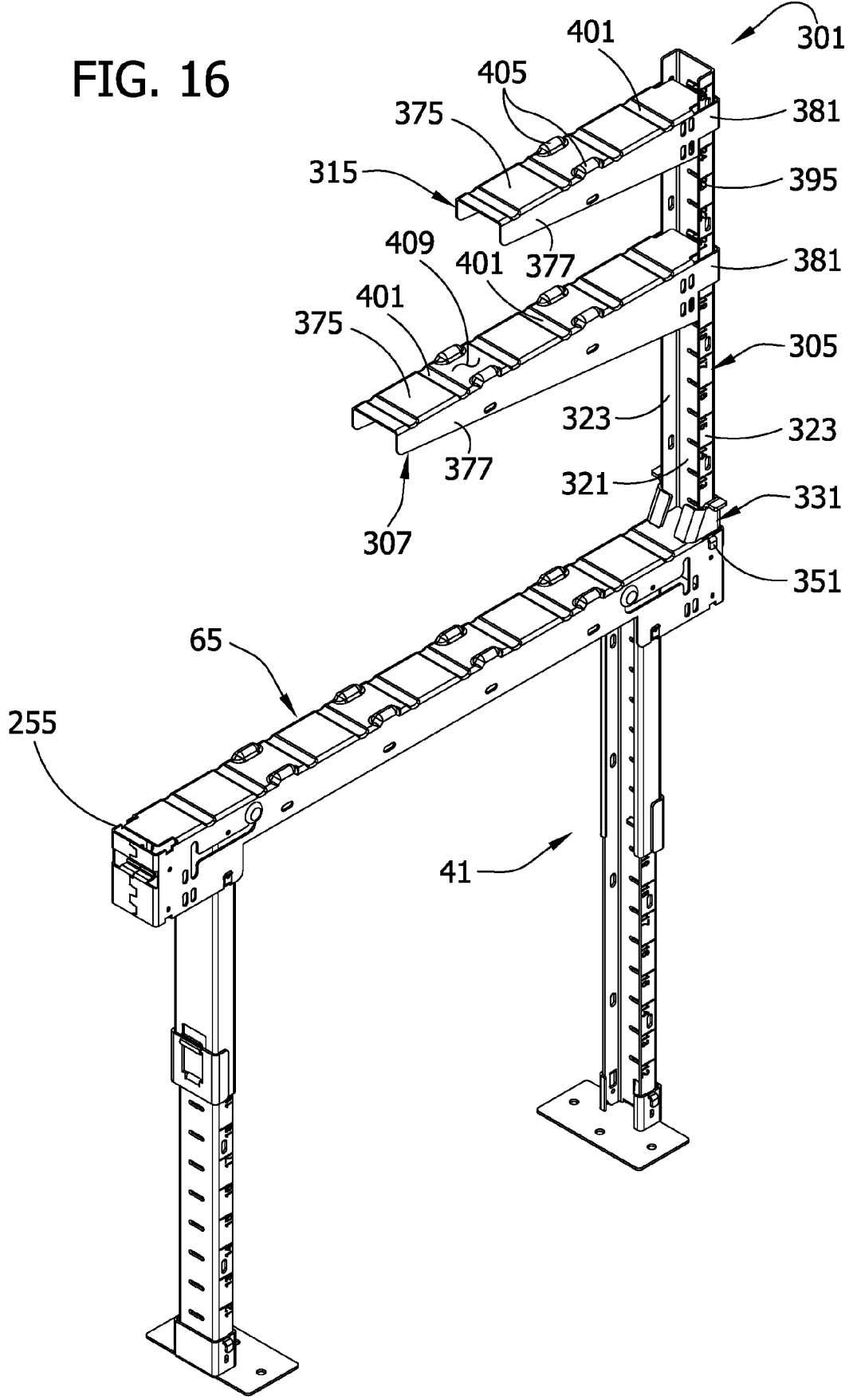
FIG. 16 is a perspective similar to FIG. 15 but viewed from a different angle.

FIG. 12 illustrates a first (lower) cable stand 41A and a second (upper) cable stand 41B stacked on top of the first stand for supporting two cable trays 45A, 45B at two different elevations. The upper and lower cable stands 41A, 41B are constructed in the manner described above, and corresponding parts are designated by the same reference numbers. Typically, the lower cable stand 41A is one stand of a first plurality of cable stands used to support a first set of one or more cable trays 45A at a first (lower) elevation, and the upper cable stand 41B is one stand of a second plurality of cable stands used to support a second set of one or more cable trays 45B at a second (upper) elevation. As illustrated, the legs 61 of the lower cable stand 41A may be set at their "narrow" spacing, if necessary, so they do not interfere with the pedestals 3 supporting the raised floor 11. The legs 61 of the upper stand 41B are set at their "wide" spacing to enable stacking. In this regard, each cable stand 41A, 41B is provided with holding mechanisms 251 for holding another cable stand in a stacked position. In one embodiment, these holding mechanisms 251 comprise openings 255 in the top wall 151 of the cross bar of the lower cable stand 41A forming sockets for receiving the lower ends of the lower leg sections 69 of an upper cable stand 41B (see FIGS. 2, 4 and 13). In the illustrated embodiment, the socket openings 255 are generally U-shaped and match the channel-shape of the lower leg sections 69 of the upper cable stand 41B. As a result, the lower leg sections 69 can be inserted down through the openings 255 to a position in which the legs rest on respective supports 159 of the cross bar (FIG. 14). For added stability, the tabs 103 on the side flanges 75 of the lower leg sections 69 are received in notches 261 (see FIGS. 3A, 13 and 14) in the side walls 153 of the cross bar 65. When thus secured in place, a first (lower) cable tray 45A may be positioned on the cross bar 65 of the lower cable stand 41A between the legs 61 of the upper cable stand 41B which are in their "wide" position to provide maximum room for the cable tray 45A. Further, a second (upper) cable tray 45B may be positioned on the cross bar 65 of the upper cable stand 41B. If desired, more than two cable stands (e.g., three or more) may be stacked together to provide any number of desired levels of cable trays.

For reasons of economy and efficiency, the various parts of the upper and lower cable stands (e.g., cross bars 65, leg sections 67, 69, locking mechanisms 121, pivot pins 165) are interchangeable. The lengths of the legs of the upper and lower stands 41A, 41B may be adjusted to appropriate lengths, depending on the amount of space below the raised floor 11 and the desired elevations of the upper and lower tiers of cable trays.

Figure 17:
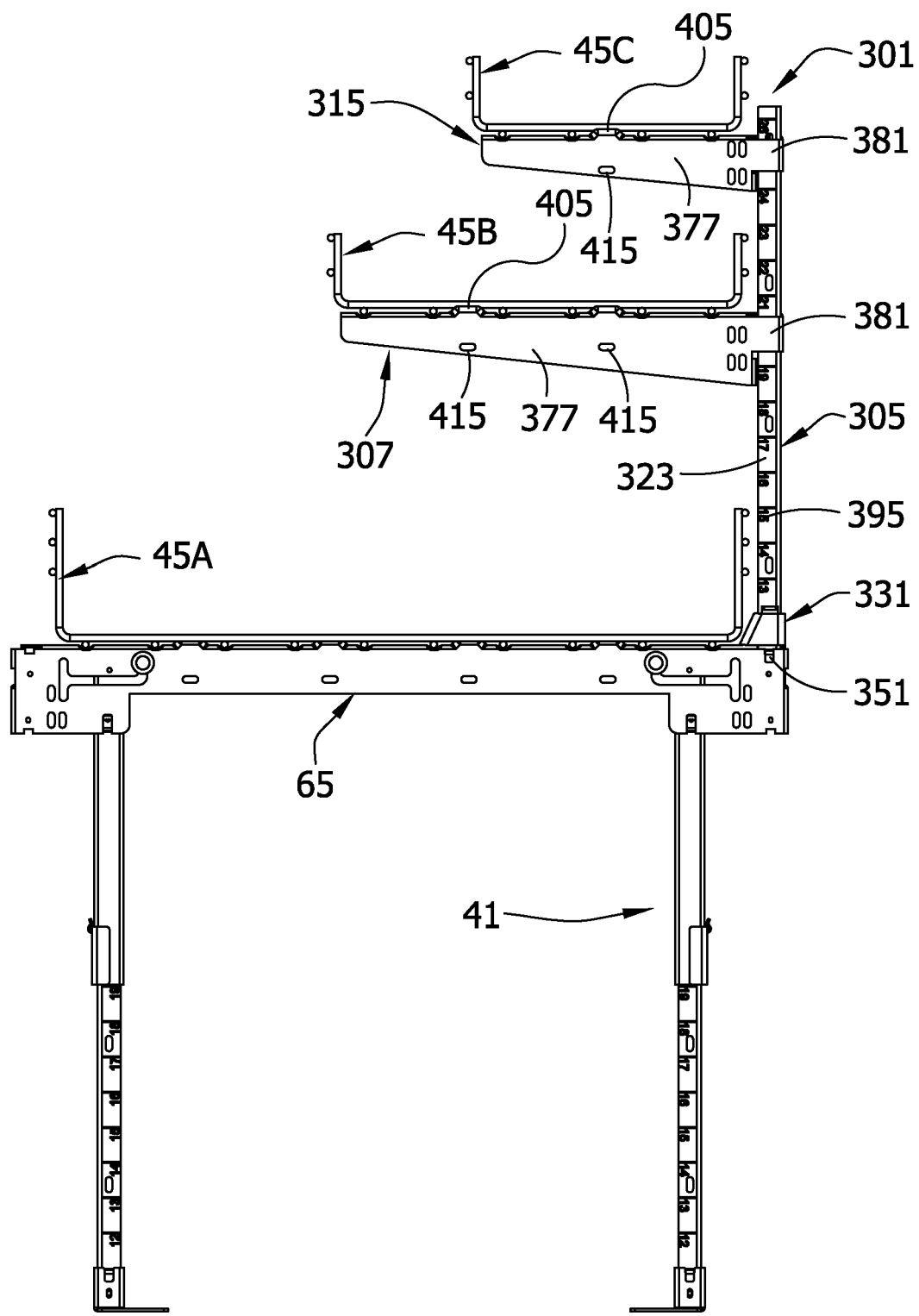
FIG. 17 is a front elevation of the embodiment of FIG. 15.
Figure 18:
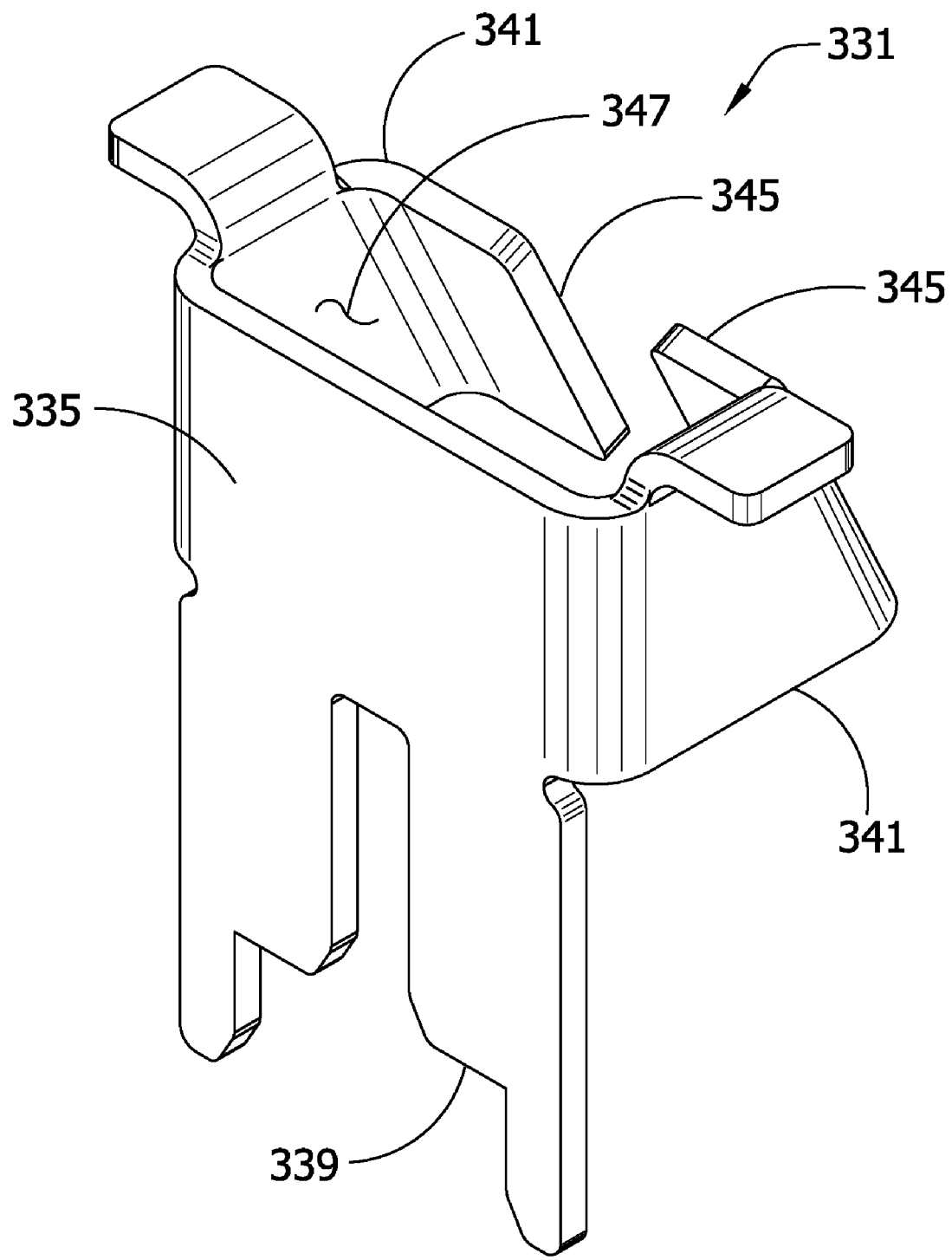
FIG. 18 is a perspective view of a socket member used in the embodiment of FIG. 15.
Figure 19:
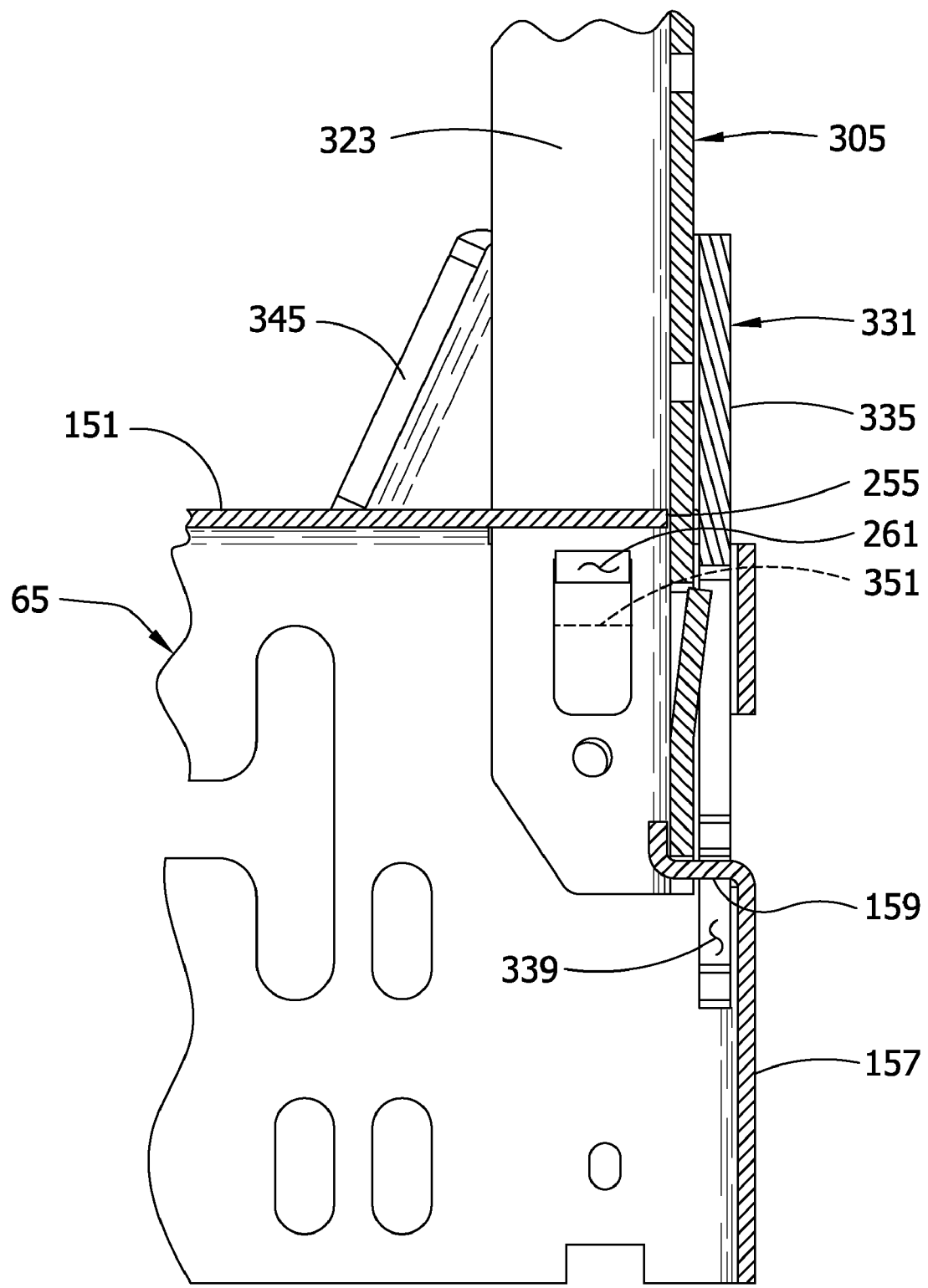
FIG. 19 is an enlarged partial section taken in the plane 19—19 of FIG. 15.

FIGS. 15-19 illustrate a system comprising a lower cable stand, generally indicated at 41, for supporting a first cable tray 45A at a first elevation, and a cantilever cable stand, generally indicated at 301, stackable on top of the lower cable stand 41 for supporting at least a second cable tray 45B at a second elevation above the first cable tray. The lower cable stand 41 is constructed as described above, and corresponding parts are designated by corresponding reference numbers. The cantilever cable stand 301 comprises one (and only one) leg 305 and a first arm 307 extending like a cantilever from the leg for supporting the second cable tray 45B in a generally horizontal position above the first cable tray 45A (FIG. 17). Optionally, the cantilever cable stand may further comprise a second arm 315 extending like a cantilever from the leg 305 above the first arm 307 for supporting a third cable tray 45C in a generally horizontal position above the second cable tray (FIG. 17).

In one embodiment, the leg 305 of the cantilever cable stand 301 is of generally channel shape, and desirably may have a configuration identical to the lower leg sections 69 of the lower cable stand 41. Specifically, the leg comprises a web 321, side flanges 323 extending from the web, and a series of horizontal slots 325 spaced at vertical intervals along the web. The lower end of the leg 305 is secured to the cross bar 65 of the lower cable stand by a holding device comprising, in this embodiment, a socket member 331 seated in one of the openings 255 at an end of the cross bar. As illustrated best in FIGS. 18 and 19, the socket member 331 comprises a generally rectangular body 335 of sheet material which slides down in the opening 255 in the cross bar 65 to a position in which the body is generally parallel to the end wall 157 of the cross bar and in which the supports 159 on the end wall of the cross bar are seated in a notch 339 extending up from a lower edge of the body. Two arms 341 extend forward from opposite sides of the body and bear on the top wall 151 of the cross bar. The arms 341 have in-turned ends 345. The body 335 and arms 341 of the socket member 331 define an opening 347 for receiving the leg 305 of the cantilever cable stand 301 which sits on the cross bar supports 161. The leg 305 is further stabilized by tabs 351 on the side flanges 323 of the leg received in the notches 261 in the side walls 153 of the cross bar 65 of the cable stand 41. During assembly, the leg 305 of the cantilever stand 301 is inserted down through a U-shaped opening 255 at a selected end of the cross bar 65 to a position in which the lower end of the leg 305 sits on the cross bar support(s) 159 and the tabs 351 are received in the notches 261 of the cross bar. The socket member 331 is then moved on the leg 305 down to the position shown in FIG. 19 in which the socket member supports and stabilizes the cantilever leg in the opening 255.

Each of the first and second (optional) cantilever arms 307, 315 of the stand 301 is of generally channel shape, having an upper wall 375 and depending side walls 377. The side walls 377 have extensions 381 which are bent and combine with the upper wall 375 of the arm to define an opening 385 sized and configured for receiving the leg 305 of the cantilever stand 301. Desirably, the opening 385 has a shape generally corresponding to the cross sectional shape of the cantilever leg 305 for a sliding fit of the leg in the opening. The arm 307, 315 has a releasable connection with the leg 305 for adjusting the vertical position of the arm along the leg. In one embodiment, the releasable connection comprises a protuberance (e.g., a tongue 391) on the arm for reception in a selected slot 325 in the leg 305 to hold the arm in a selected vertical position corresponding to the desired elevation of the second (and, optionally, the third) cable tray 45B, 45C. The arm 307, 315 may be moved from one elevation to another simply by rotating the arm up to remove the tongue 391 from the slot 325, sliding the arm up or down on the leg 305 to the desired new elevation, and rotating the arm down back to a generally horizontal position in which the tongue is received in a different slot corresponding to the desired elevation. Other releasable connections may be used. Indicia 395 are provided on the leg for indicating the various positions at which the arm (or arms) may be positioned.

The top wall 375 of the first cantilever arm 307 (and second cantilever arm 315, if used) has formations configured for holding basket wire cable tray 45B (45C) in position. These formations include a series of parallel recesses (e.g., grooves 401) in the upper face of the top wall 325 for receiving the longitudinal wires 55 of the cable tray, and pairs of opposing bosses 405 projecting up from the top wall. The bosses 405 define a recess 409 for receiving one or more transverse wires 57 of a basket cable tray. Slots 415 are provided at intervals along the side walls 377 of the arm 307 for use in securing the cable tray to the cable stand by cable ties, clips or other fastening devices.

The legs 305 and arms 307, 315 of the cantilever cable stand 301 are desirably fabricated as metal parts, e.g., stamped metal parts. However, it will be understood that they be formed from materials other than metal.

Figure 20:
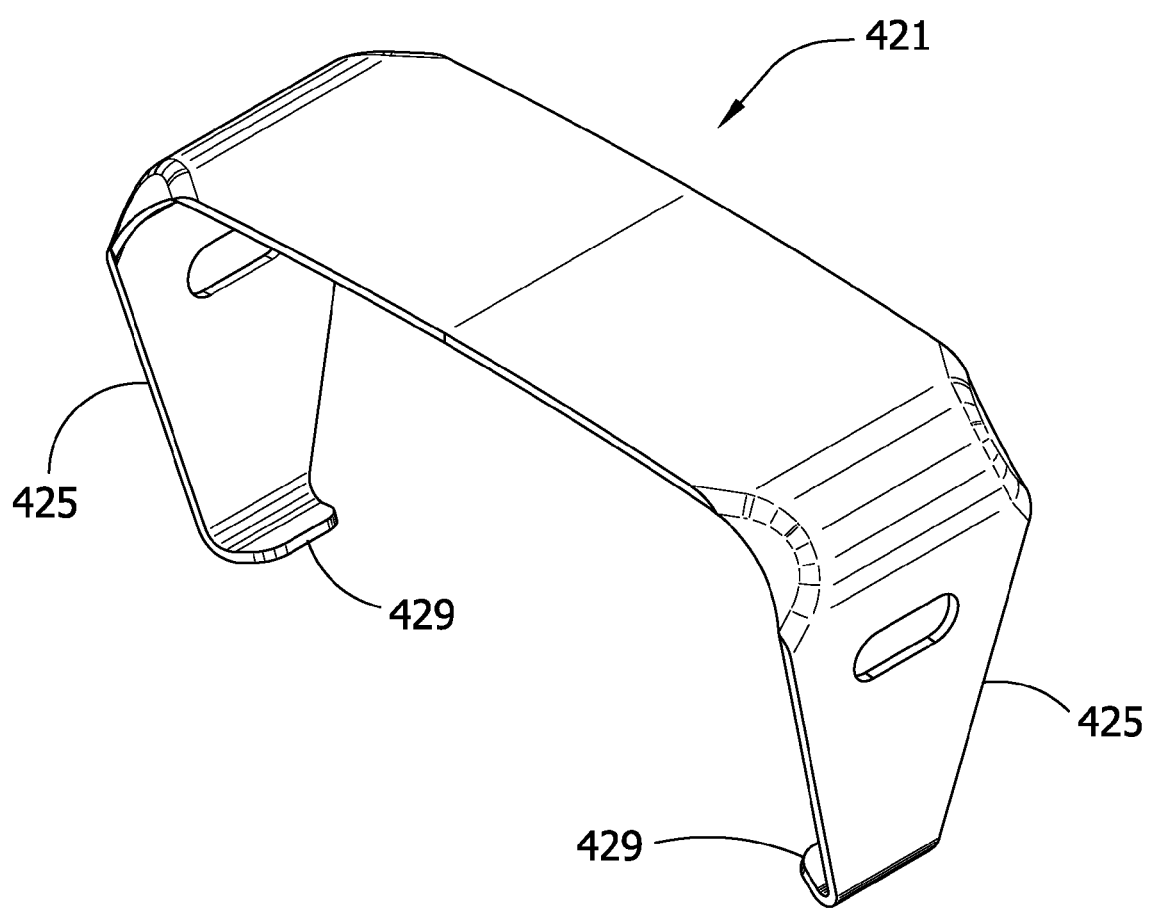
FIG. 20 is a perspective view of a spring clip.
Figure 21:
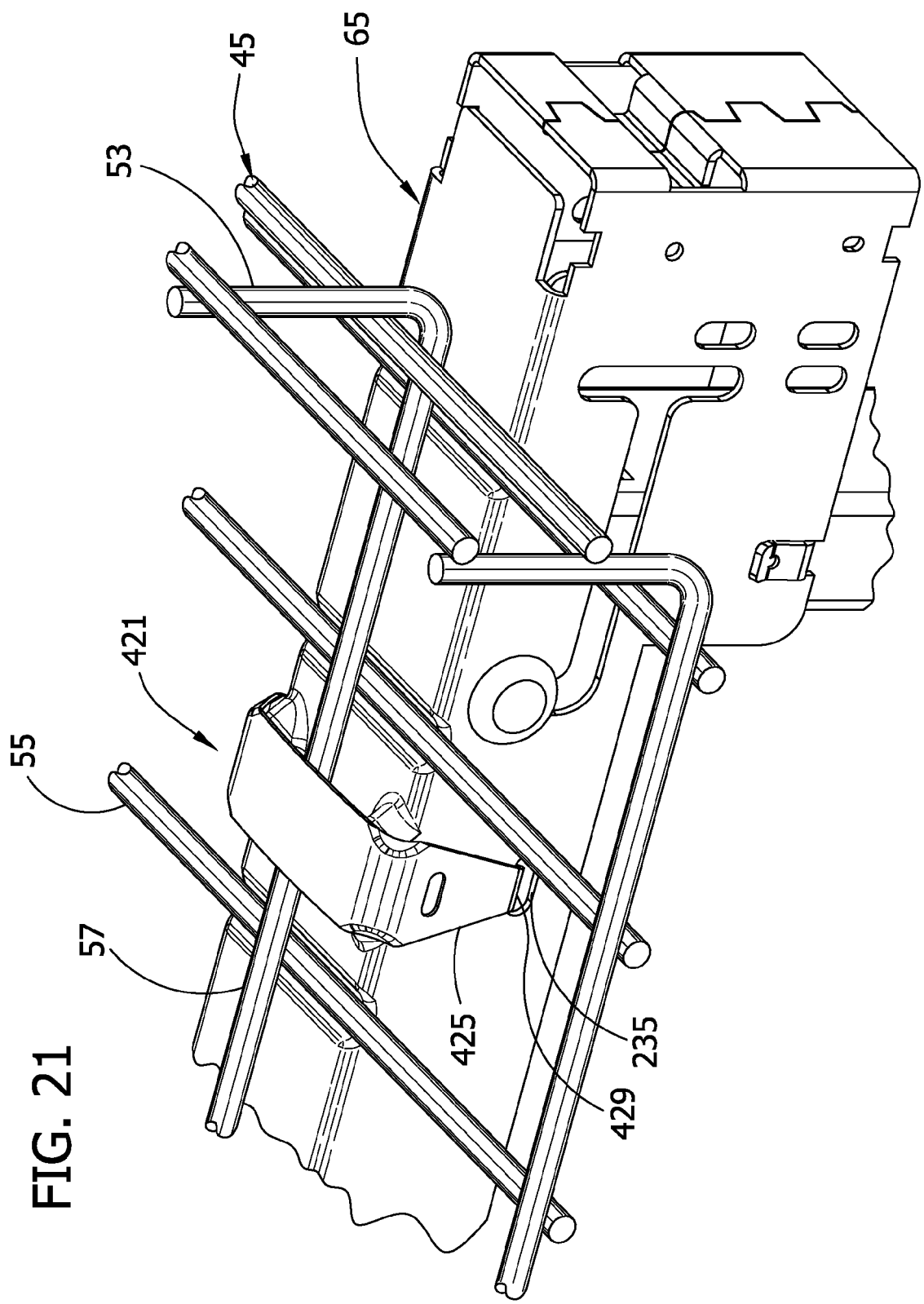
FIG. 21 is a partial perspective view showing a cable tray secured to the cross bar of a cable stand by the spring clip of FIG. 20.

The cable trays 45, 45A, 45B, 45C may be further secured to the cable stands 41, 301 by spring clips 421, one of which is shown in FIG. 20. The clip 421 comprises a generally C-shaped member of spring steel or other resilient material. Desirably, the clip is of one-piece construction and is designed for use with stand 41 and stand 301. The clip 421 has two arms 425 with in-turned portions 429 (e.g., ends) sized to fit into respective openings 235, 415 in the cross bar and arm(s) 307, 315 of the cable stands 41, 301. The spacing between the in-turned portions 429 of the arms 425 is less than the width of the top wall 151 of the cross bar 65 and less than the width of the upper wall 375 of the cantilever arm 307, 315. After a cable tray 45 has been positioned on the cross bar 65, the clip 421 is pushed down to the position shown in FIG. 21. During the process, the resilient arms 425 of the clip 421 spread apart until the in-turned portions 429 of the arms move into registry with the openings 235 in the cross bar, at which time the in-turned portions snap into the openings to secure the clip to the cross bar. In this position, the clip 421 bridges over a transverse wire 57 of the cable tray to hold the cable tray down on the cross bar. The same process is used for installing a clip 421 on an arm 307, 315 of the cantilever stand 301. More than one clip 421 can be used to secure the cable tray on the stand. Since the arms 425 are resilient, the clip can be readily removed, if necessary.

The under-floor cable support system 31 described above is easy to use and flexible in its configuration. Cable stands 41 of appropriate width are selected, depending on the spacing of the floor pedestals 3. The lengths of the legs 61 of the cable stands can be adjusted easily and quickly using the leg locking mechanisms 121. If more than one level of cable tray 45 is needed, a set of upper cable stands 41B can be stacked on the lower cable stands 41A, without the use of fasteners, simply by moving the legs 61 of the upper cable stands to their "wide" positions and then inserting the lower ends of the legs into the socket openings 255 at the ends of the cross bars 65 of the lower cable stands. Any number of cable tray levels (one, two, three, four, etc.) may be created by using the cable stands of this invention. If cantilever cable stands 301 are desired, these stands can be stacked on the lower cable stands 41A in the manner described above. Further, for compactness during shipment and storage, the feet 95 on the legs 61 of the cable stands 41 can be removed and the legs pivoted to their collapsed positions. Since the cable stands 41 are free-standing and do not require connection to the floor pedestals 3 of the raised floor system, the cable stands can be installed either before or after the floor pedestals are placed in position, depending on the convenience of the customer. Further, the cable stands 41, 301 of the present invention can be used with different types of raised floor systems. Moreover, because the various parts of the stands are modular and interchangeable, the cost of manufacture is reduced and less inventory is required. The number of parts and fasteners is also minimized to save labor during assembly and use of the cable stands.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:
1. An under-floor support system, comprising
a plurality of floor pedestals positioned on a sub-floor for supporting a floor above the sub-floor,
a first plurality of free-standing cable stands positioned on the sub-floor, said cable stands being movable independent of said floor pedestals, each cable stand of said first plurality of cable stands comprising a pair of spaced apart legs having upper and lower ends, and a fixed-length channel cross bar supported by the legs adjacent the upper ends of the legs, the channel cross bar comprising a top wall and a pair of spaced apart side walls extending down from the top wall, the legs of the cable stand extending up between the side walls and being adjustable toward and away from one another to different positions along the fixed length of the cross bar to adjust the spacing between the legs of the cable stand without changing the length of the cross bar, a first set of one or more cable trays supported in a generally horizontal position by at least two cable stands of said first plurality of cable stands, said first set of one or more cable trays resting on the cross bars of the at least two cable stands at an elevation above the sub-floor and below the floor, and holding mechanisms on the cable stands of the first plurality of cable stands for holding a second plurality of cable stands stacked on top of the first plurality of cable stands.

2. An under-floor support system as set forth in claim 1 further comprising a second plurality of cable stands stacked on top of said first plurality of cable stands, each cable stand of said second plurality of cable stands comprising a pair of spaced apart legs having upper and lower ends, and a cross bar supported by the legs adjacent the upper ends of the legs, and at least a second set of one or more cable trays supported in a generally horizontal position by at least two cable stands of said second plurality of cable stands, said second set of one or more cable trays resting on the cross bars of the at least two cable stands of said second plurality of cable stands at an elevation above the first set of one or more cable trays and below the floor.

3. An under-floor support system as set forth in claim 2 wherein the elevations of the cross bars of said first and second pluralities of cable stands are adjustable to vary the elevations at which the first and second sets of cable trays are supported.

4. An under-floor support system as set forth in claim 2 wherein said holding mechanisms comprise sockets adjacent opposite ends of the cross bar of each of the first plurality of free-standing cable stands, said sockets being sized to receive the lower ends of the legs of a respective cable stand of said second plurality of cable stands.

5. An under-floor support system as set forth in claim 4 wherein the cross bar of each cable stand of said second plurality of cable stands has a length which is fixed and non-adjustable, and wherein the spacing between the legs of each cable stand of said second plurality of cable stands is adjustable.

6. An under-floor support system as set forth in claim 4 wherein the legs of each cable stand of said first and second plurality of cable stands are adjustable from a first position in which the legs are spaced relatively close together and a second position in which the legs are spaced farther apart, said holding mechanisms comprising upwardly-opening sockets adjacent opposite ends of the cross bar of each cable stand of said first plurality of cable stands, said sockets being sized to receive the lower ends of the legs of a respective cable stand of said second plurality of cable stands when the legs of the respective cable stand of said second plurality of cable stands are in said second position.

7. An under-floor support system as set forth in claim 6 wherein the legs of each cable stand of said first plurality of cable stands are in said first position and the legs of each cable stand of said second plurality of cable stands are in said second position.

8. An under-floor support system as set forth in claim 1 further comprising a second plurality of cantilever cable stands adapted to be stacked on top of said first plurality of cable stands, each cantilever cable stand of said second plurality of cable stands comprising a leg and an arm extending like a cantilever from the leg for supporting a cable tray at an elevation above a cable tray of said first set of one or more cable trays.

9. An under-floor support system as set forth in claim 1 wherein the first set of one or more cable trays includes a basket cable tray comprising longitudinal wires extending longitudinally of the cable tray and transverse wires extending transversely of the cable tray, said cross bar having upwardly opening recesses for receiving said longitudinal wires and said transverse wires of the basket cable tray.

10. An under-floor cable support system for supporting cable above a sub-floor and below a floor supported by floor pedestals on the sub-floor, said under-floor cable support system comprising a first plurality of free-standing cable stands adapted to be positioned on the sub-floor, said cable stands being movable independent of said floor pedestals, each cable stand of said first plurality of cable stands comprising a pair of spaced apart legs having upper and lower ends, and a cross bar supported by the legs adjacent the upper ends of the legs, the cross bar of each cable stand of said first plurality of cable stands having a length which is fixed and non-adjustable, connections between the legs and cross bar of each cable stand of said first plurality of cable stands for permitting movement of both legs along the cross bar toward and away from one another to adjust the spacing between the legs of each cable stand, said legs being movable between a first position in which the legs are spaced relatively close together to avoid interference with said floor pedestals and a second position in which the legs are spaced farther apart to allow stacking of one cable stand on top of another, said first plurality of cable stands being adapted to support a set of one or more cable trays or cables in a generally horizontal position with the set of one or more cable trays or cables resting on the cross bars of the cable stands at an elevation above the sub-floor and below the floor, and wherein the cross bar of each cable stand of said first plurality of cable stands is a channel cross bar comprising a top wall and a pair of spaced apart side walls extending down from the top wall, the legs of the cable stand extending up between the side walls and being adjustable toward and away from one another to different positions along the fixed length of the cross bar to adjust the spacing between the legs of the cable stand without changing the length of the cross bar.

11. An under-floor cable support system as set forth in claim 10 wherein said connections are sliding connections between the legs and the side walls of the cross bar.

12. An under-floor cable support system as set forth in claim 11 wherein said sliding connections are pin-and-slot connections, each pin-and-slot connection comprising a slot in at least one of the side walls of the cross bar and a pin on a respective leg received in the slot, said slot having a horizontal segment in which the pin on the respective leg may slide to adjust the spacing between the legs of the cable stand.

13. An under-floor cable support system as set forth in claim 12 further comprising locking means for releasably holding the legs in adjusted position.

14. An under-floor cable support system as set forth in claim 12 wherein the slot of said pin-and-slot connection comprises at least two horizontally spaced vertical segments extending vertically from said horizontal segment, the pin of said pin-and-slot connection being movable into a vertical segment selected according to the desired spacing between the legs of the cable stand.

15. An under-floor cable support system as set forth in claim 14 wherein the legs of each cable stand of said first plurality of cable stands have lengths which are adjustable to vary the elevation at which the set of one or more cable trays is supported.

16. An under-floor cable support system as set forth in claim 10 wherein the legs pivot on the cross bar between a generally vertical cable supporting position and a collapsed position in which the extend generally parallel to the cross bar.

17. An under-floor cable support system as set forth in claim 16 wherein said connections between the legs and cross bar are pivot connections movable relative to the crossbar in both vertical and horizontal directions.

18. An under-floor cable support system as set forth in claim 10 wherein the set of one or more cable trays includes a basket cable tray comprising longitudinal wires extending longitudinally of the cable tray and transverse wires extending transversely of the cable tray, the cross bar of each of the plurality of cable stands having upwardly opening recesses for receiving said longitudinal wires and said transverse wires of the basket cable tray.

19. An under-floor cable support system as set forth in claim 10 further comprising holding mechanisms on the cable stands of said first plurality of cable stands for holding a second plurality of cable stands stacked on top of the first plurality of cable stands.

20. An under-floor cable support system for supporting cable above a sub-floor and below a floor supported by floor pedestals on the sub-floor, said under-floor cable support system comprising
a plurality of free-standing cable stands adapted to be positioned on the sub-floor, said cable stands being movable independent of said floor pedestals,
each cable stand of said plurality of cable stands comprising a pair of spaced apart legs having upper and lower ends, and a cross bar supported by the legs adjacent the upper ends of the legs,
pivot connections between the legs and cross bar of each cable stand of said plurality of cable stands whereby the legs may be pivoted between a generally vertical position for supporting the cable stand and a collapsed generally horizontal position in which the legs overlap one another and extend along the cross bar,
at least one of said pivot connections being vertically movable relative to the crossbar whereby the legs may be positioned parallel to one another and flat against one another when they are in said collapsed position, said pivot connections being vertically offset when the legs are in said collapsed position,
said plurality of cable stands being adapted to support a set of one or more cable trays or cables in a generally horizontal position with the set of one or more cable trays or cables resting on the cross bars of the cable stands at an elevation above the sub-floor and below the floor,
wherein said at least one pivot connection is a pin-and-slot connection between a leg and the cross bar of the cable stand for adjusting the horizontal spacing between the legs of the cable stand.

21. An under-floor cable support system as set forth in claim 20 wherein said pin-and-slot connection comprises a slot having a vertical segment to permit vertical movement of said pivot connection.

22. An under-floor cable support system as set forth in claim 20 wherein the cross bar of each cable stand of said plurality of cable stands has a length which is fixed and non-adjustable.

23. An under-floor cable support system as set forth in claim 20 further comprising locking means for releasably holding the legs in adjusted position.

24. An under-floor cable support system as set forth in claim 20 wherein the pivot connections between the legs and cross bar of the cable stand are movable relative to the cross-bar in both vertical and horizontal directions.

25. An under-floor cable support system as set forth in claim 20 wherein the legs of each cable stand of said plurality of cable stands have lengths which are adjustable to vary the elevation at which the set of one or more cable trays is supported.

26. An under-floor cable support system as set forth in claim 20 wherein the set of one or more cable trays includes a basket cable tray comprising longitudinal wires extending longitudinally of the cable tray and transverse wires extending transversely of the cable tray, the cross bar of each of the plurality of cable stands having upwardly opening recesses for receiving said longitudinal wires and said transverse wires of the basket cable tray.

27. An under-floor cable support system for supporting cable above a sub-floor and below a floor supported by floor pedestals on the sub-floor, said under-floor cable support system comprising
at least one first cable stand adapted to be positioned on the sub-floor,
the first cable stand comprising a pair of spaced apart legs having upper and lower ends, and a fixed-length channel cross bar supported by the legs adjacent the upper ends of the legs, the channel cross bar comprising a top wall and a pair of spaced apart side walls extending down from the top wall, the legs of the cable stand extending up between the side walls and being adjustable toward and away from one another to different positions along the fixed length of the cross bar to adjust the spacing between the legs of the cable stand without changing the length of the cross bar,
the first cable stand being adapted to support a first cable tray or cable in a generally horizontal position resting on the cross bar of the first cable stand at an elevation above the sub-floor and below the floor, and
at least one cantilever cable stand stackable on the first cable stand,
said at least one cantilever cable stand comprising a leg and a first arm extending as a cantilever from the leg for supporting a second cable tray or cable in a generally horizontal position at an elevation above said first cable tray.

28. An under-floor cable support system as set forth in claim 27 further comprising a holding device for holding the leg of the cantilever cable stand on the first cable stand in a position in which the arm of the cantilever cable stand extends generally over and generally parallel to the cross bar of the first cable stand.

29. An under-floor cable support system as set forth in claim 27 wherein said first arm is adjustable up and down along the leg of the cantilever cable stand.

30. An under-floor cable support system for supporting cable above a sub-floor and below a floor supported by floor pedestals on the sub-floor, said under-floor cable support system comprising
- at least one first cable stand adapted to be positioned on the sub-floor,
- the first cable stand comprising a pair of spaced apart legs having upper and lower ends, and a cross bar supported by the legs adjacent the upper ends of the legs,
- the first cable stand being adapted to support a first cable tray or cable in a generally horizontal position resting on the cross bar of the first cable stand at an elevation above the sub-floor and below the floor, and
- at least one cantilever cable stand stackable on the first cable stand,
- said at least one cantilever cable stand comprising a leg and a first arm extending as a cantilever from the leg for supporting a second cable tray or cable in a generally horizontal position at an elevation above said first cable tray,
- wherein said first arm is adjustable up and down along the leg of the cantilever cable stand, and
- a releasable connection between said first arm and said leg of the cantilever cable stand, said connection comprising an opening in the first arm for receiving the leg such that the first arm surrounds the leg and is slidable up and down on the leg, and a protuberance on the first arm receivable in a selected one of a plurality of openings in the leg spaced vertically along the leg.

31. An under-floor cable support system as set forth in claim 27 further comprising a second arm extending as a cantilever from the leg of the cantilever cable stand generally parallel to said first arm.

32. An under-floor cable support system as set forth in claim 31 wherein said first and second arms are adjustable up and down along the leg of the cantilever cable stand.

33. An under-floor support system, comprising
- a plurality of floor pedestals positioned on a sub-floor for supporting a floor above the sub-floor,
- a first plurality of free-standing cable stands positioned on the sub-floor, said cable stands being movable independent of said floor pedestals,
- each cable stand of said first plurality of cable stands comprising a pair of spaced apart legs having upper and lower ends, and a cross bar supported by the legs adjacent the upper ends of the legs,
- a first set of one or more cable trays supported in a generally horizontal position by at least two cable stands of said first plurality of cable stands, said first set of one or more cable trays resting on the cross bars of the at least two cable stands at an elevation above the sub-floor and below the floor, and
- holding mechanisms on the cable stands of the first plurality of cable stands for holding a second plurality of cable stands stacked on top of the first plurality of cable stands,
- wherein said holding mechanisms comprise slots in the cross bars of the cable stands of the first plurality of cable stands for receiving the legs of the cable stands of the second plurality of cable stands.

34. An under-floor support system as set forth in claim 9 wherein the upwardly opening recesses are defined by grooves in the cross bar for receiving the longitudinal wires and bosses on the crossbar for receiving the transverse wires.

35. An under-floor support system as set forth in claim 18 wherein the upwardly opening recesses are defined by grooves in the cross bar for receiving the longitudinal wires and bosses on the crossbar for receiving the transverse wires.

36. An under-floor support system as set forth in claim 26 wherein the upwardly opening recesses are defined by grooves in the cross bar for receiving the longitudinal wires and bosses on the crossbar for receiving the transverse wires.

* * * * *